(12) United States Patent
Cisneros, Jr. et al.

(10) Patent No.: US 11,728,052 B2
(45) Date of Patent: Aug. 15, 2023

(54) FAST SPECTRUM MOLTEN CHLORIDE TEST REACTORS

(71) Applicant: TerraPower, LLC, Bellevue, WA (US)

(72) Inventors: Anselmo T. Cisneros, Jr., Seattle, WA (US); Francesco Deleo, Redmond, WA (US); Michael J. Edwards, Renton, WA (US); Gregory T. Markham, Bellevue, WA (US); James A. Roecker, Bellevue, WA (US); Noor Ullah, Bothell, WA (US); Daniel J. Walter, North Bend, WA (US); Kent E. Wardle, Renton, WA (US)

(73) Assignee: Terra Power, LLC, Bellevue, WA (US)

( * ) Notice: Subject to any disclaimer, the term of this patent is extended or adjusted under 35 U.S.C. 154(b) by 0 days.

(21) Appl. No.: 17/387,320

(22) Filed: Jul. 28, 2021

(65) Prior Publication Data
US 2022/0051818 A1 Feb. 17, 2022

Related U.S. Application Data

(60) Provisional application No. 63/066,664, filed on Aug. 17, 2020.

(51) Int. Cl.
*G21C 15/12* (2006.01)
*G21C 3/54* (2006.01)
(Continued)

(52) U.S. Cl.
CPC ............... *G21C 15/12* (2013.01); *G21C 3/54* (2013.01); *G21C 11/06* (2013.01); *G21C 15/243* (2013.01)

(58) Field of Classification Search
CPC . G21C 1/02; G21C 1/022; G21C 1/32; G21C 1/322; G21C 1/326; G21C 11/06
See application file for complete search history.

(56) References Cited

U.S. PATENT DOCUMENTS

| 2,375,009 A | 5/1945 | Lepsoe et al. |
| 2,874,106 A | 2/1959 | Hammond et al. |

(Continued)

FOREIGN PATENT DOCUMENTS

| CA | 631890 | 11/1961 |
| CN | 1922695 | 2/2007 |

(Continued)

OTHER PUBLICATIONS

Abbott et al, Thermal and Mechanical Design Aspects of the LIFE Engine, Fusion Science and Technology Dec. 2008; 56(2).
(Continued)

*Primary Examiner* — Jack W Keith
*Assistant Examiner* — Joshua C Devorkin
(74) *Attorney, Agent, or Firm* — Merchant and Gould, PC

(57) ABSTRACT

Alternative designs for a modular test reactor are presented. In one aspect, a molten fuel salt nuclear reactor includes a vessel defining a reactor volume, the vessel being open-topped and otherwise having no penetrations. A neutron reflector is provided within the vessel and displacing at least some of the reactor volume, the neutron reflector defining a reactor core volume. A plurality of heat exchangers are contained within the vessel above the neutron reflector. A flow guide assembly is provided within the neutron reflector that includes a draft tube draft tube separating a central portion of the reactor core volume from an annular downcomer duct. Fuel salt circulates from the reactor core volume, through the heat exchangers, into the downcomer duct and then back into the reactor core volume.

19 Claims, 17 Drawing Sheets

(51) Int. Cl.
   *G21C 11/06* (2006.01)
   *G21C 15/243* (2006.01)

(56) References Cited

U.S. PATENT DOCUMENTS

| | | | |
|---|---|---|---|
| 2,920,024 A | 1/1960 | Barton et al. | |
| 2,945,794 A | 7/1960 | Winters et al. | |
| 3,010,889 A | 11/1961 | Fortescue et al. | |
| 3,018,239 A | 1/1962 | Happell et al. | |
| 3,029,130 A | 4/1962 | Moore | |
| 3,046,212 A | 7/1962 | Anderson | |
| 3,136,700 A | 6/1964 | Poppendiek et al. | |
| 3,178,356 A | 4/1965 | Wheelock | |
| 3,216,901 A | 11/1965 | Teitel | |
| 3,218,160 A | 11/1965 | Knighton et al. | |
| 3,262,856 A | 7/1966 | Bettis | |
| 3,275,422 A | 9/1966 | Cathers et al. | |
| 3,287,225 A | 11/1966 | Ackroyd et al. | |
| 3,368,945 A | 2/1968 | Keller et al. | |
| 3,383,285 A | 5/1968 | Ackroyd et al. | |
| 3,450,198 A | 6/1969 | Brunner | |
| 3,743,577 A | 7/1973 | Bettis et al. | |
| 3,785,924 A | 1/1974 | Notari | |
| 3,909,351 A | 9/1975 | Tilliette | |
| 3,996,099 A | 12/1976 | Faugeras et al. | |
| 3,997,413 A | 12/1976 | Fougner | |
| 4,039,377 A | 8/1977 | Andrieu et al. | |
| 4,045,286 A | 8/1977 | Blum et al. | |
| 4,056,435 A | 11/1977 | Carlier et al. | |
| 4,216,821 A | 8/1980 | Robin | |
| 4,284,473 A | 8/1981 | Kasama | |
| 4,309,252 A | 1/1982 | Gilroy | |
| 4,342,721 A | 8/1982 | Pomie | |
| 4,397,778 A | 8/1983 | Lloyd | |
| 4,639,350 A | 1/1987 | Malaval | |
| 4,762,667 A | 8/1988 | Sharbaugh | |
| 4,786,464 A | 11/1988 | Bardot | |
| 4,820,476 A | 4/1989 | Popalis | |
| 5,185,120 A | 2/1993 | Fennern | |
| 5,196,159 A | 3/1993 | Kawashima et al. | |
| 5,223,210 A | 6/1993 | Hunsbedt et al. | |
| 5,380,406 A | 1/1995 | Horton et al. | |
| 5,421,855 A | 6/1995 | Hayden et al. | |
| 5,596,611 A | 1/1997 | Ball | |
| 5,730,874 A | 3/1998 | Wai et al. | |
| 5,770,085 A | 6/1998 | Wai et al. | |
| 5,792,357 A | 8/1998 | Wai et al. | |
| 5,910,971 A | 6/1999 | Ponomarev-Stepnoy et al. | |
| 6,181,759 B1 | 1/2001 | Heibel | |
| 7,217,402 B1 | 5/2007 | Miller et al. | |
| 8,132,410 B2 | 3/2012 | Oh et al. | |
| 8,416,908 B2 | 4/2013 | Mann | |
| 8,529,713 B2 | 9/2013 | Ahlfeld et al. | |
| 8,594,268 B2 | 11/2013 | Shu | |
| 8,734,738 B1 | 5/2014 | Herrmann | |
| 9,171,646 B2 | 10/2015 | Moses et al. | |
| 9,721,678 B2 | 8/2017 | Cheatham et al. | |
| 10,043,594 B2 | 8/2018 | Scott | |
| 10,141,079 B2 | 11/2018 | Czerwinski et al. | |
| 10,438,705 B2 | 10/2019 | Cheatham | |
| 10,497,479 B2 | 12/2019 | Abbott et al. | |
| 10,734,122 B2 | 8/2020 | Cisneros et al. | |
| 10,867,710 B2 | 12/2020 | Cisneros et al. | |
| 10,878,969 B2 | 12/2020 | Huke et al. | |
| 2004/0114703 A1 | 6/2004 | Bolton et al. | |
| 2005/0220251 A1 | 10/2005 | Yokoyama et al. | |
| 2008/0232533 A1 | 9/2008 | Blanovsky | |
| 2008/0273650 A1 | 11/2008 | Yokoyama et al. | |
| 2008/0310575 A1 | 12/2008 | Cinotti | |
| 2010/0226471 A1* | 9/2010 | Cinotti | F28F 1/003 376/299 |
| 2011/0131991 A1 | 6/2011 | Oh et al. | |
| 2011/0222642 A1 | 9/2011 | Gautier | |
| 2011/0286563 A1 | 11/2011 | Moses et al. | |
| 2011/0286565 A1 | 11/2011 | Tsang | |
| 2011/0305309 A1 | 12/2011 | Brown | |
| 2012/0027156 A1 | 2/2012 | Peterson | |
| 2012/0051481 A1 | 3/2012 | Shu | |
| 2012/0056125 A1 | 3/2012 | Raade et al. | |
| 2012/0069946 A1 | 3/2012 | Hamill et al. | |
| 2012/0183112 A1 | 7/2012 | LeBlanc | |
| 2012/0275558 A1* | 11/2012 | Cinotti | G21C 1/322 376/406 |
| 2012/0288048 A1 | 11/2012 | Mann | |
| 2012/0314829 A1 | 12/2012 | Greene | |
| 2013/0083878 A1 | 4/2013 | Massie et al. | |
| 2013/0180520 A1 | 7/2013 | Raade et al. | |
| 2013/0182813 A1 | 7/2013 | Bingham | |
| 2013/0272470 A1 | 10/2013 | Whitten et al. | |
| 2014/0023172 A1 | 1/2014 | Leblanc | |
| 2014/0166924 A1 | 6/2014 | Raade et al. | |
| 2015/0010875 A1 | 1/2015 | Raade et al. | |
| 2015/0036779 A1 | 2/2015 | LeBlanc | |
| 2015/0078504 A1 | 3/2015 | Woolley | |
| 2015/0117589 A1 | 4/2015 | Kamei | |
| 2015/0170766 A1 | 6/2015 | Singh et al. | |
| 2015/0228363 A1 | 8/2015 | Dewan et al. | |
| 2015/0243376 A1 | 8/2015 | Wilson | |
| 2015/0310943 A1 | 10/2015 | Kielb et al. | |
| 2015/0357056 A1 | 12/2015 | Shayer | |
| 2016/0005497 A1 | 1/2016 | Scott | |
| 2016/0189806 A1 | 6/2016 | Cheatham, III et al. | |
| 2016/0189812 A1 | 6/2016 | Czerwinski et al. | |
| 2016/0189813 A1 | 6/2016 | Cisneros et al. | |
| 2016/0189816 A1 | 6/2016 | Czerwinski et al. | |
| 2016/0196885 A1 | 7/2016 | Singh | |
| 2016/0217874 A1 | 7/2016 | Dewan et al. | |
| 2016/0260505 A1 | 9/2016 | Cadell et al. | |
| 2016/0260509 A1 | 9/2016 | Kim et al. | |
| 2016/0300628 A1* | 10/2016 | Fortino | G21C 19/28 |
| 2017/0084355 A1 | 3/2017 | Scott | |
| 2017/0092381 A1 | 3/2017 | Cisneros et al. | |
| 2017/0117065 A1 | 4/2017 | Scott | |
| 2017/0213610 A1 | 7/2017 | Sumita et al. | |
| 2017/0301413 A1 | 10/2017 | Cisneros et al. | |
| 2017/0301418 A1 | 10/2017 | Dodson et al. | |
| 2017/0301421 A1 | 10/2017 | Abbott et al. | |
| 2017/0316840 A1 | 11/2017 | Abbott et al. | |
| 2017/0316841 A1 | 11/2017 | Abbott et al. | |
| 2018/0019025 A1 | 1/2018 | Abbott et al. | |
| 2018/0047467 A1 | 2/2018 | Czerwinski et al. | |
| 2018/0068750 A1 | 3/2018 | Cisneros et al. | |
| 2018/0137944 A1* | 5/2018 | Abbott | G21C 11/06 |
| 2018/0277260 A1 | 9/2018 | Marcille et al. | |
| 2019/0139665 A1 | 5/2019 | Czerwinski et al. | |
| 2019/0172594 A1 | 6/2019 | Lyons et al. | |
| 2019/0237205 A1 | 8/2019 | Abbott et al. | |
| 2019/0311816 A1 | 10/2019 | Sumita et al. | |
| 2020/0027590 A1 | 1/2020 | Cisneros et al. | |
| 2020/0118698 A1 | 4/2020 | Cheatham et al. | |
| 2020/0122109 A1 | 4/2020 | Kruizenga et al. | |
| 2020/0185114 A1 | 6/2020 | Abbott et al. | |
| 2020/0211724 A1 | 7/2020 | Cisneros et al. | |
| 2020/0357531 A1 | 11/2020 | Inman et al. | |

FOREIGN PATENT DOCUMENTS

| | | |
|---|---|---|
| CN | 101939793 | 1/2011 |
| CN | 104145309 | 11/2014 |
| CN | 107112055 | 9/2020 |
| DE | 1112791 | 10/1963 |
| DE | 1439107 | 2/1969 |
| EP | 0617430 | 9/1994 |
| EP | 2815404 A1 | 12/2014 |
| EP | 33570680 | 8/2018 |
| FR | 2296248 | 11/1977 |
| GB | 739968 | 11/1955 |
| GB | 835266 | 5/1960 |
| GB | 964841 | 7/1964 |
| GB | 2073938 B | 7/1984 |
| GB | 2511113 | 8/2014 |
| GB | 2508537 | 12/2014 |
| GB | 2516046 | 1/2015 |
| JP | 35013995 | 9/1960 |

(56) References Cited

FOREIGN PATENT DOCUMENTS

| | | |
|---|---|---|
| JP | 571991 | 1/1982 |
| JP | 1991282397 | 10/1991 |
| JP | 06174882 A | 6/1994 |
| JP | 11174194 | 7/1999 |
| JP | 2001133572 | 5/2001 |
| JP | 2003063801 | 3/2003 |
| JP | 2010223942 | 10/2010 |
| JP | 2012047531 | 3/2012 |
| JP | 2014119429 | 12/2012 |
| JP | 2014534413 | 12/2014 |
| JP | 2015510588 | 4/2015 |
| RU | 57040 U1 | 9/2006 |
| RU | 2424587 | 7/2011 |
| WO | 200003399 | 1/2000 |
| WO | 2009135286 | 11/2009 |
| WO | 2013085383 | 6/2013 |
| WO | 2013116942 | 8/2013 |
| WO | 2013180029 | 12/2013 |
| WO | 2014039641 | 3/2014 |
| WO | 2014074930 | 5/2014 |
| WO | 2014128457 | 8/2014 |
| WO | 2014196338 | 12/2014 |
| WO | 2015140495 | 9/2015 |
| WO | 2016109565 | 7/2016 |
| WO | 2016197807 | 12/2016 |
| WO | 2018013317 | 1/2018 |
| WO | 2018026429 A2 | 2/2018 |
| WO | WO-2018026429 A2 * | 2/2018 |
| WO | 20211339522 A2 | 7/2021 |

OTHER PUBLICATIONS

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.
Ashraf-Khorassani, Mehdi, Michael T. Combs, and Larry T. Taylor. "Solubility of metal chelates and their extraction from an aqueous environment via supercritical $CO_2$." Talanta 44.5 (1997): 755-763.
ASTM International, Designation: B898-11, Standard Specification for Reactive and Refractory Metal Clad Plate (Sep. 2011), 15 pages.
Bertch, T.C., Selective Gaseous Extraction Research, Development and Training for Isotope Production, Final Technical Report for the Period Apr. 1, 2012 through Mar. 31, 2014, General Atomics, 27 pgs.
Borts, B., et al. "The study of supercritical extraction of complexes of molybdenum with carbon dioxide." 6 (6) (2016): 57-63.
Chapter 20, Creeping Flow, Physics of Continuous Matter, Exotic and Everyday Phenomena in the Macroscopic World, Lautrup, B., The Niels Bohr Institute, Copenhagen, Denmark, 2004.
Chou, Wei-Lung, et al., "Removal of gallium (iii) ions from acidic aqueous solution by supercritical carbon dioxide extraction in the green separation process." Journal of hazardous materials 160.1 (2008): 6-12.
Clarno, K.T. et al., "Trade studies for the liquid-salt-cooled very high-temperature reactor: fiscal year 2006 progress report", ORNL/TM-2006 140 (2007), 35 pgs.
Cohen et al., "Vanadium-Lined HT9 Cladding Tubes", Argonne National Lab ANL/ET/CP-80384, (Feb. 1994), 12 pgs.
Donnelly et al., Fabrication of Heat Exchanger Tube Bundle for the Molten-Salt Reactor Experiment, ORNL-3500, Dec. 9, 1963.
EESR EP15875826.8 European Extended Search Report in European Application EP15875826.8, dated Sep. 6, 2018, 7 pages.
EP15876187.4 European Extended Search Report for EP 15876187.4 dated Sep. 11, 2018, 10 pages.
ESR20211581.2 European Extended Search Report in European Application EP 20 21 1581.2, dated Mar. 24, 2021, 8 pages.
Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.
Forsberg et al., Fluoride-Salt-Cooled High-Temperature Reactor (FHR) for Power and Process Heat, Final Project Report, MIT-ANP-TR-157, Dec. 2014, 62 pgs.
Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.
Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.
Freeman et al., "Archimedes Plasma Mass Filter," AIP Conf. Proc. 694, 403 (2003).
Gen IV International Forum, Molten Salt Reactor (MSR), https://www.gen-4.org/gif/jcms/c_9359/msr, accessed Feb. 26, 2016, 3 pgs.
Grimes, W. R., "Molten-Salt Reactor Chemistry," Nucl. Appl. Technol. vol 8, 137-155 (1970).
Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.
Holcomb, et al. Fast Spectrum Molten Salt Reactor Options, Jul. 2011, 46 pages. Available at: http://info.ornl.gov/sites/publications/files/Pub29596.pdf.
Hung, Laurence, et al. "Supercritical $CO_2$ extraction of molybdenum-ligand complexes from sulfuric solutions." The Journal of Supercritical Fluids 111 (2016): 97-103.
Kimura-Neutron Spectrum in Small Iron Pile Surrounded by Lead Reflector, Journal of Nuclear Science and Technology, 15(3), pp. 183-191 (Mar. 1978).
Kramer et al., Fusion-Fission Blanket Options for the LIFE Engine, Fusion Science and Technology, vol. 60, pp. 72-77, Jul. 2011.
Kramer et al., Parameter study of the LIFE engine nuclear design, Energy Conversion and Management, 51, pp. 1744-1750, 2010.
Kuznetsov et al., Electrochemical Behavior and Some Thermodynamic Properties of UC1 [sub 4] and UC1 [sub 3] Dissolved in a LiC1-KC1 Eutectic Melt, Journal of the Electrochemical Society, vol. 152, No. 4, Jan. 2005, 11 pages.
Li, et al., "Affinity Extraction into $CO_2$. 2. Extraction of Heavy Metals into C02 from Low-pH Aqueous Solutions", Ind. Eng. Chem. Res. 37:4763-4773 (1998).
Lin et al., "Supercritical fluid extraction and chromatography of metal chelates and organometallic compounds" trends in analytical chemistry 14(3):123-133 (1995).
Maltsev et al., Redox potentials of uranium in molten eutectic mixture of lithium, potassium, and cesium chlorides, Russian Metallurgy, Maiknauka-Interperidica, RU, vol. 2016, No. 8, Dec. 2016.
Mekki et al., "Extraction of Lanthanides from Aqueous Solution by Using Room-Temperature Ionic Liquid and Supercritical Carbon Dioxide in Conjunction" Chem. Eur. J. 12:1760-1766 (2006).
Merle-Lucotte, E., Introduction to the Physics of the Molten Salt Fast Reactor, Thorium Energy Conference 2013 (ThEC13), 2013.
Molten Salt Reactor (MSR) Review: Feasibility Study of developing a pilot scale molten salt reactor in the UK, Jul. 2015, Energy Process Development, LTD (available at www.energyprocessdevelopments.com).
Mourogov et al., Potentialities of the fast spectrum molten salt reactor concept: REBUS-3700, Energy Conversion and Management, Mar. 30, 2006, vol. 47, No. 17, pp. 2761-2771.
MSR-FUJI General Information, Technical Features, and Operating Characteristics.
Ottewitte, E. H. , "Configuration of a Molten Chloride Fast Reactor on a Thorium Fuel Cycle to Current Nuclear Fuel Cycle Concerns," Ph.D. dissertation, University of California at Los Angeles, 1982.
Ottewitte, E. H., Cursory First Look at the Molten Chloride Fast Reactor as an Alternative to the Conventional BATR Concept.
PCT/US2015/000499 IPRP+WO—International Preliminary Report on Patentability and Written Opinion in International Application PCT/US2015/000499, dated Jul. 4, 2017, 9 pages.

(56) References Cited

OTHER PUBLICATIONS

PCT/US2015/000499 ISR + WO—International Search Report and Written Opinion in International Application PCT/US2015/000499, dated Jul. 22, 2016, 11 pages.
PCT/US2015/067704 IPRP + WO—International Preliminary Report on Patentability and Written Opinion dated Jul. 4, 2017, 7 pages.
PCT/US2015/067704 ISR + WO—International Search Report and Written Opinion.
PCT/US2015/067905 IPRP—International Preliminary Report on Patentability dated Jul. 4, 2017, 14 pages.
PCT/US2015/067905 ISR + WO—International Search Report and Written Opinion in International Application PCT/US2015/067905 dated Aug. 5, 2016, 18 pages.
PCT/US2015/067923 IPRP—International Preliminary Report on Patentability dated Jul. 4, 2017, 7 pages.
PCT/US2015/067923 ISR + WO—International Search Report and Written Opinion in International Application PCT/US2015/067923, dated Apr. 19, 2016.
PCT/US2016/055001 IPRP + WO—International Preliminary Report on Patentability and Written Opinion dated Apr. 12, 2018, 9 pages.
PCT/US2016/055001 ISR + WO—International Search Report and Written Opinion in International Application PCT/US2016/055001, dated Jan. 25, 2017, 11 pages.
PCT/US2017/030455 IPRP—International Preliminary Report on Patentability dated Nov. 6, 2018, 17 pages.
PCT/US2017/030455 ISR + WO—International Search Report and Written Opinion dated Jan. 30, 2018, 23 pages.
PCT/US2017/030457 IPRP—International Preliminary Report on Patentability dated Nov. 15, 2018, 15 pages.
PCT/US2017/030457 ISR + WO—International Search Report and Written Opinion in International Application PCT/US2017/030457, dated Jan. 23, 2018, 20 pages.
PCT/US2017/030666 ISR + WO, date mailed Jul. 20, 2017.
PCT/US2017/030666 PCT International Preliminary Report on Patentability in International Application PCT/US2017/030666 dated Nov. 6, 2018, 9 pages.
PCT/US2017/030672 IPRP + WO—International Preliminary Report on Patentability and Written Opinion dated Nov. 6, 2018, 7 pages.
PCT/US2017/030672 ISR + WO—International Search Report and Written Opinion in International Application No. PCT/US2017/030672, dated Sep. 27, 2017, 9 pages.
PCT/US2017/038806 IPRP + WO—International Preliminary Report on Patentability and Written Opinion in International Application PCT/US2017/038806, dated Jan. 15, 2019, 7 pgs.
PCT/US2017/038806 ISR + WO—International Search Report and Written Opinion dated Oct. 16, 2017.
PCT/US2017/046139 IPRP + WO—International Preliminary Report on Patentability and Written Opinion dated Feb. 12, 2019, 8 pgs.
PCT/US2017/046139 ISR + WO—International Search Report and Written Opinion, dated Jan. 17, 2018, 16 pgs.
PCT/US2017/061843 IPRP + WO—International Preliminary Report on Patentability and Written Opinion in International Application PCT/US2017/061843, dated May 21, 2019, 13 pages.
PCT/US2017/061843 ISR + WO—International Search Report and Written Opinion in International Application PCT/US2017/061843, dated Oct. 29, 2018, 23 pages.
PCT/US2019/015967 IPRP—International Preliminary Report on Patentability (IPRP) dated Aug. 13, 2020.
PCT/US2019/015967 ISR + WO—International Search Report and Written Opinion of PCT/US2019/015967, dated Jun. 12, 2019, 25 pages.
PCT/US2019/021791 IPRP—PCT International Preliminary Report on Patentability in International Application PCT/US2019/021791, dated Sep. 24, 2020, 9 pages.
PCT/US2019/021791 ISR + WO—International Search Report and Written Opinion in International Application PCT/US2019/021791, dated Nov. 19, 2019, 15 pages.
PCT/US2019/051345 ISR + WO—International Search Report and Written Opinion in International Application PCT/US2019/051345, dated Mar. 5, 2020, 15 pages.
PCT/US2020/066599 ISR + WO dated May 17, 2021, 17 pages.
PCT/US2020/066908 Search report and written opinion, dated Aug. 16, 2021, 22 pages.
Reactor Start-up Procedure. Technical University Dresden. Reactor Training Course, pp. 3-4. <https://tu-dresden.de/ng/maschinenwesen/iet/wket/ressourcen/dateien/akr2/Lehrmaterialien/start_e.pdf?lang=en>. (Mar. 2015), 21 pgs.
Reactor Training Course Experiment Reactor Start-up Procedure, Technical University Dresden, Institute of Power Engineering Training Reactor.
Rough et al, Preliminary thermal-hydraulic core design of the Molten Salt Fast Reactor (MSFR), Annals of Nuclear Energy 64 (2014) 449-456.
Rykhlevskii, Andrei, et al., Fuel Cycle Performance of Fast Spectrum Molten Salt Reactor Designs. Oak Ridge National Lab (ORNL), Oak Ridge, TN (United States), 2019. (Year: 2019), 13 pages.
Scott, Ian and Durham John, the Simple Molten Salt Reactor, Practical, safe and cheap, Moltex Energy LLP presentation slides, 19 pgs.
Scott, Ian: Safer, cheaper nuclear: The simple molten salt reactor, http://www.ee.co.za/article/safer-cheaper-nuclear-simple-molten-salt-reactor.html, Dec. 2, 2014, 10 pgs.
Takata et al., Conceptual Design on Fast Reactor Fuel Reprocessing System Using Super-Direx Process, pp. 5 (Apr. 25-29, 2004).
Taube, et al., Molten Plutonium Chlorides Fast Breeder Reactor Cooled by Molten Uranium Chloride, Annals of Nuclear Science and Engineering, vol. 1, pp. 277-281., 1974.
Thoma, R. E., "Chemical Aspects of MSRE Operations," ORNL-4658, Dec. 1971.
TRANSATOMIC Power Technical White Paper, Mar. 2014, V1.0.1., (2014), http://www.transatomicpower.com/, 34 pgs.
Van't Eind, R.J.S., Simulation of a Fast Molten Salt Reactor, PSR-131-2011-009, Jul. 2011, 68 pages.
Wai, C. M. "Supercritical Fluid Extraction of Trace Metals from Solid and Liquid Materials for Analytical Application." Analytical sciences 11.1 (1995): 165-167.
Wai, C.M. and Shaofen Wang. "Supercritical fluid extraction: metals as complexes." Journal of chromatography A 785. 1-2 (1997): 369-383.
Wang et al., "Extraction of Uranium from Aqueous Solutions by Using Ionic Liquid and Supercritical Carbon Dioxide in Conjunction" Chem. Eur. J. 15:4458-4463 (2009).
Wang Shaofen et al., "Application of Supercritical Fluid Extraction Technology on the Treatment of Nuclear Waste", Applied Chemistry, vol. 20, No. 5, pp. 409-414, May 31, 2003.
Wang, Jun-Wei et al.: "Influence of MgCl2 content on corrosion behavior of GH1140 in molten NaCl-MgCl2 as thermal storage medium", Solar Energy Materials and Solar Cells, Elsevier Science Publishers, Amsterdam, NL, vol. 179, Nov. 20, 2017, pp. 194-201, ISSN: 0927-0248.
Xu et al., Thorium Energy R&D in China, THEO13, CERN, Oct. 28, 2013, 59 pgs.
Yamaji et al., Experimental and numerical thermal-hydraulics investigation of a molten salt reactor concept core, KERNTECHNIK 82 (2017) 4.
Yamaji et al., Experimental investigation of the MSFR molten salt reactor concept, KERNTECHNIK 79 (2014) 5, pp. 408-416.
Yamaji et al., Experimental Modelling and Numerical Analysis of a Molten Salt Fast Reactor, PHYSOR 2014—The Role of Reactor Physics Toward a Sustainable Future, Kyoto, Japan, Sep. 28-Oct. 2, 2014.
Yamaji et al., Thermal-hydraulic analyses and experimental modelling of MSFR, Annals of Nuclear Energy 64 (2014) 457-471.
Zhao et al., Review Use of ionic liquids as 'green' solvents for extractions, J. Chem. technol. Biotechnol. 80: 1089-1096 (2005), pp. 1089-1096 (2005).
Zhu et al., "Extraction of Actinides and Lanthanides by Supercritical Fluid" Journal of Engineering for Gas Turbines and Power 133:1-8 (May 2011).
International Search Report for application No. PCT/US2021/043416, dated Jan. 14, 2022, 7 pages.
Sabharwall, Plyush, et al., "Small Modular molten salt reactor (SM-MSR),"Small Modular Reactors Symposium. vol. 54730. 2011.

(56) References Cited

OTHER PUBLICATIONS

ORNL-2474 (Oak Ridge National Laboratory), Molten-Salt Reactor Program Quarterly Progress Report for Period Ending Jan. 31, 1958, H.G. MacPherson, Program Director, Date Issued May 1, 1958, pp. 41-44.
Patent Search Report, Eurasian Patent Office, Eurasian application No. 202193104, dated Jun. 13, 2022—Search report sent in FA eml dated Jun. 12, 2022./rt.
Gehin, Jess C., and Jeffrey J. Powers. "Liquid Fuel Molten Salt Reactors for Thorium Utilization." Nuclear Technology 194.2, 2016, pp. 152-161.
Renault, Claude et al. "The Molten Salt Reactor (MSR) R&D Status and Perspectives in Europe.", 2010, 16 pages.

* cited by examiner

FAST SPECTRUM MOLTEN CHLORIDE TEST REACTORS

CROSS REFERENCE TO RELATED APPLICATIONS

The present application claims the benefit of U.S. Provisional Patent Application No. 63/066,664, titled "Molten Chloride Demonstration Reactor" and filed Aug. 17, 2020, which application is hereby incorporated by reference herein.

INTRODUCTION

Test reactors are nuclear reactors designed to allow for the efficient testing and assessment of the reactor's design and technology. Not intended to be commercial reactors, test reactors are typically smaller scale nuclear reactors that may be provided with additional features to facilitate testing of different reactor operating scenarios, reactor configurations, and transient conditions like fueling, reactor startup, and reactor shutdown. Even though not intended to be commercial reactors, test reactors generate heat and the dissipation of the heat generated during operation may or may not include the generation of useable power.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, every component even when illustrated may not be expressly labeled in every figure.

DETAILED DESCRIPTION

Figures 1A, 1B:
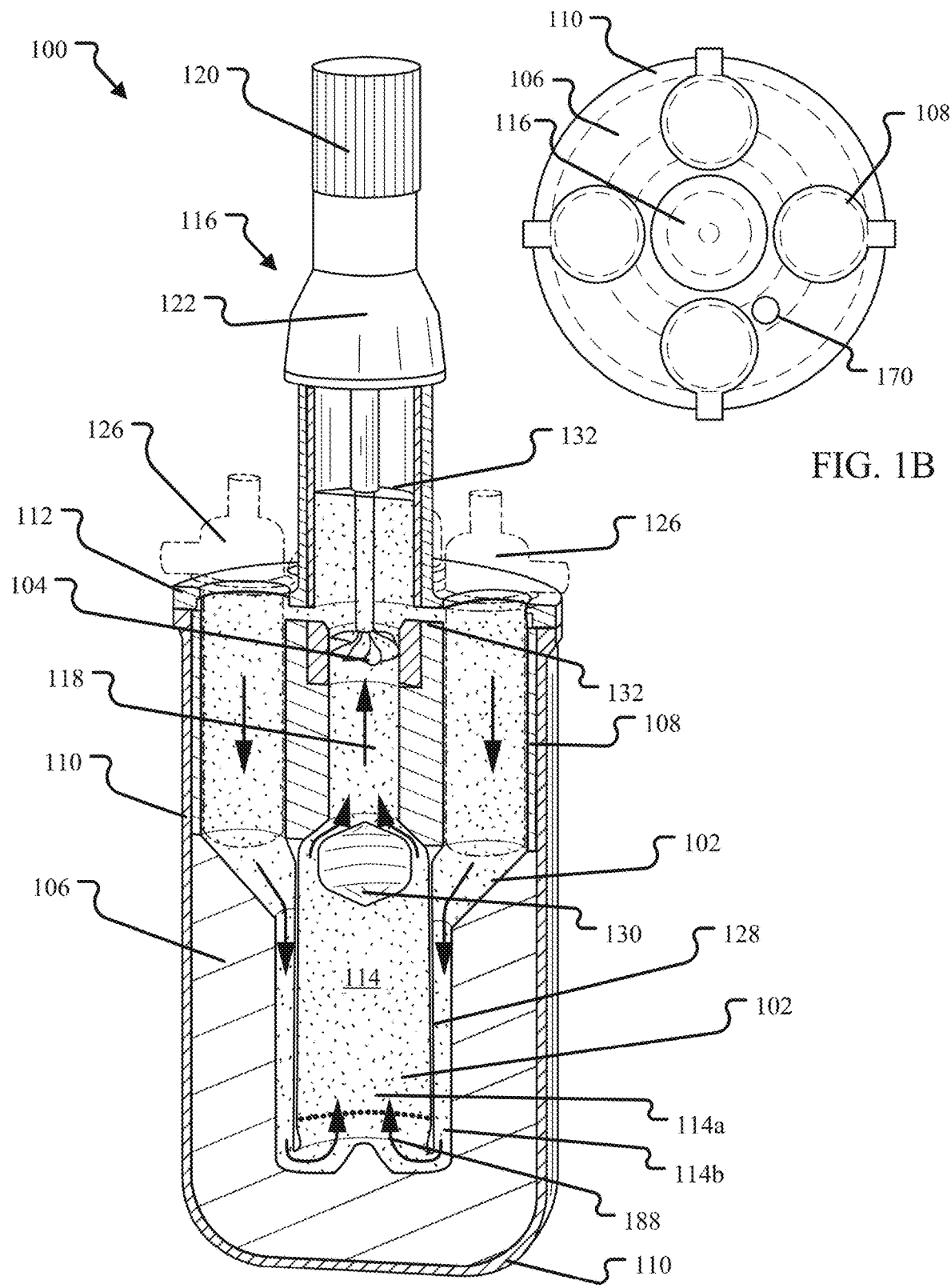
FIGS. 1A-1G illustrate a four heat exchanger embodiment of a test reactor.

This document describes alternative designs for a test molten chloride salt nuclear reactor that can be used to advance the understanding of molten salt reactors, their design and their operation. While described in terms of a molten chloride fast reactor (MCFR), aspects and technologies described herein may be adapted to other types of fuel salts such as, for example, fluoride fuel salts, potassium fuel salts and mixed fuel salts (e.g., Cl—F, Cl—K, etc.). Furthermore, the disclosed designs are directed to a fast spectrum nuclear reactor but aspects and some designs may be suitable for use as a thermal spectrum nuclear reactor. The designs presented include reactors having a reactor core system designed to allow the investigation of such phenomena as: Low effective delayed neutron fraction, due to delayed neutron precursor advection and presence of plutonium in the fuel salt; Negative fuel density (expansivity) reactivity coefficient; Reactivity effects associated with asymmetric flow and thermal distribution (velocity and temperature) of fuel salt entering the active core; K-effective stability (reactivity fluctuations) due to flow instabilities and/or recirculations; and, Approach to criticality (startup), reactivity control, and shutdown. While not intended to be commercial scale, many of the concepts, methods, embodiments, and technologies described herein could be scaled up or otherwise implemented in a commercial scale reactor. Nothing in this application should be read as indicating that the technology herein is suitable only for use in a test reactor unless explicitly stated.

Before the test reactor designs and operational concepts are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments of the nuclear reactor only and is not intended to be limiting. It must be noted that, as used in this specification, the singular forms "a," "an," and "the" include plural referents unless the context clearly dictates otherwise. Thus, for example, reference to "a lithium hydroxide" or "a chloride salt" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

As used herein, two components may be referred to as being in "thermal communication" when energy in the form of heat may be transferred, directly or indirectly, between the two components. For example, a wall of container may be said to be in thermal communication with the material in contact with the wall. Likewise, two components may be referred to as in "fluid communication" or "hydraulically connected" if a fluid can flow from one component to the other. For example, in a circuit where liquid is flowed from a compressor to an expander, the compressor and expander are in fluid communication or, equivalently, hydraulically connected." Thus, given a sealed container of heated liquid, the liquid may be considered to be in thermal communication (via the walls of the container) with the environment external to the container but the liquid is not in fluid communication with the environment because the liquid is not free to flow into the environment.

The reactor design is a liquid fueled system in which the molten fuel salt serves as both fuel and heat transfer fluid, unlike some incrementally advanced designs in which the salt is merely a coolant and fabricated solid fuel is still necessary. In MCFR reactor systems, fuel is synthesized either off-site or in the reactor prior to start up. MCFR technology can accommodate various fuel compositions in support of a range of operational missions going from high-resource utilization breed-and-burn operation to high-burn configuration for plutonium disposition. By using chloride salts, the reactor can achieve a high heavy metal fraction in the fuel and operates in a fast neutron spectrum—consequently, criticality is less sensitive to the amount of fission products in the fuel salt, avoiding both the expense and proliferation risk associated with online chemical/electrochemical reprocessing. Fissile materials are not separated in any portion of the MCFR fuel cycle and always remain homogenously mixed with uranium, other actinides, and soluble fission products, which enhances proliferation resistance. Online fuel polishing operations use physical means to separate volatile and solid fission products enabling irradiated fuel removed from one MCFR to seed a daughter reactor in place of enriched uranium without additional processing. MCFR technology is based on a characteristic of chloride fuel salts which offers reactor stability through uniquely strong negative temperature and void coefficients: As local fuel temperature increases, the liquid fuel expands and reactivity consequently goes down, providing a natural protection against a runaway reaction. This improves safety, simplifies control system requirements, and enables completely passive decay heat removal via natural circulation heat transport.

FIGS. 1A-1G illustrate a four heat exchanger embodiment of a test reactor. The reactor 100 is a pool-type reactor—meaning that the reactor fuel 102, fuel pump impeller 104 portion of the pump assembly 116, reflectors 106, heat exchangers 108, and control elements are all contained in an enclosed vessel 110 with no bottom penetrations—with a general layout as depicted in transparent view FIG. 1A. The molten fuel salt 102 fills in all the space within the vessel 110 that is not taken up by components (e.g., reflector modules 106, pump impeller 104, and heat exchangers 108), shielding, or fuel displacement elements. This forms a central 'active' critical core region 114 as well as fuel channels connecting the active core 114 with the pump impeller 104 and primary heat exchangers (PHX) 108. Reactor control elements (not shown) enter through the vessel head 112 and are positioned within the radial reflector region surrounding the active core 114. Multiple fuel circuits operate in parallel to circulate fuel between the active core region 114 and PHXs 108 where heat is removed by the primary cooling system (PCS) and transferred outside the nuclear island for power generation. In the event of a loss of forced flow, the reactor 100 is capable of retaining the fuel safely in the vessel 110 and removing decay heat via robust natural circulation without the need for nuclear safety class emergency backup power systems (e.g., emergency diesel generators).

The fuel salt pump assembly 116 is connected to the vessel head 112 and provides circulation between the active core and Primary Heat Exchangers (PHX). The pump assembly includes a motor 120 above and external to the reactor vessel 110. The motor 120 drives a shaft 122 which extends downwardly into the vessel and is attached to an impeller 104. Rotation of the impeller 104 drives liquid fuel salt upwardly out of the reactor core 114 through a central upcomer duct 118 at the top of which the fuel is distributed, in the embodiment shown in FIGS. 1A-1F, evenly between four different heat exchanger circuits each containing a primary heat exchanger 108. Primary coolant salt inlet and outlet flows are connected ex-vessel to the PHX heads 126 and while in vessel 110 are contained and isolated from fuel salt in U-tube bundles of the four PHXs 108. Shaft 122 sealing is to be accomplished by application of a double mechanical gas seal which takes in a barrier gas at a pressure higher than the pumps' internal cover gas pressure to ensure process gases do not leak out of the system. The pump's 116 rotating and discharge assembly can be removed from the vessel head 112 as discussed in greater detail with reference to FIG. 1D.

An expansion column 132 is provided directly above the impeller 104 and the inlet ducts 134 to the PHXs 108. The expansion column 132 is a volume hydraulically connected to the fuel salt circuit. The expansion column 132 provides a location for cover gas pressure application to provide suction pressure for cavitation prevention and additionally serves as a place for cover gas sweep for removal of fission gasses evolving from the fuel salt. The fuel salt level in the expansion column 132 changes height based on the mass of fuel salt in the reactor and the density of the fuel salt, which changes with temperature. In the embodiment shown, the headspace above the fuel salt is filled with argon or other inert gas under pressure.

Figure 1C:
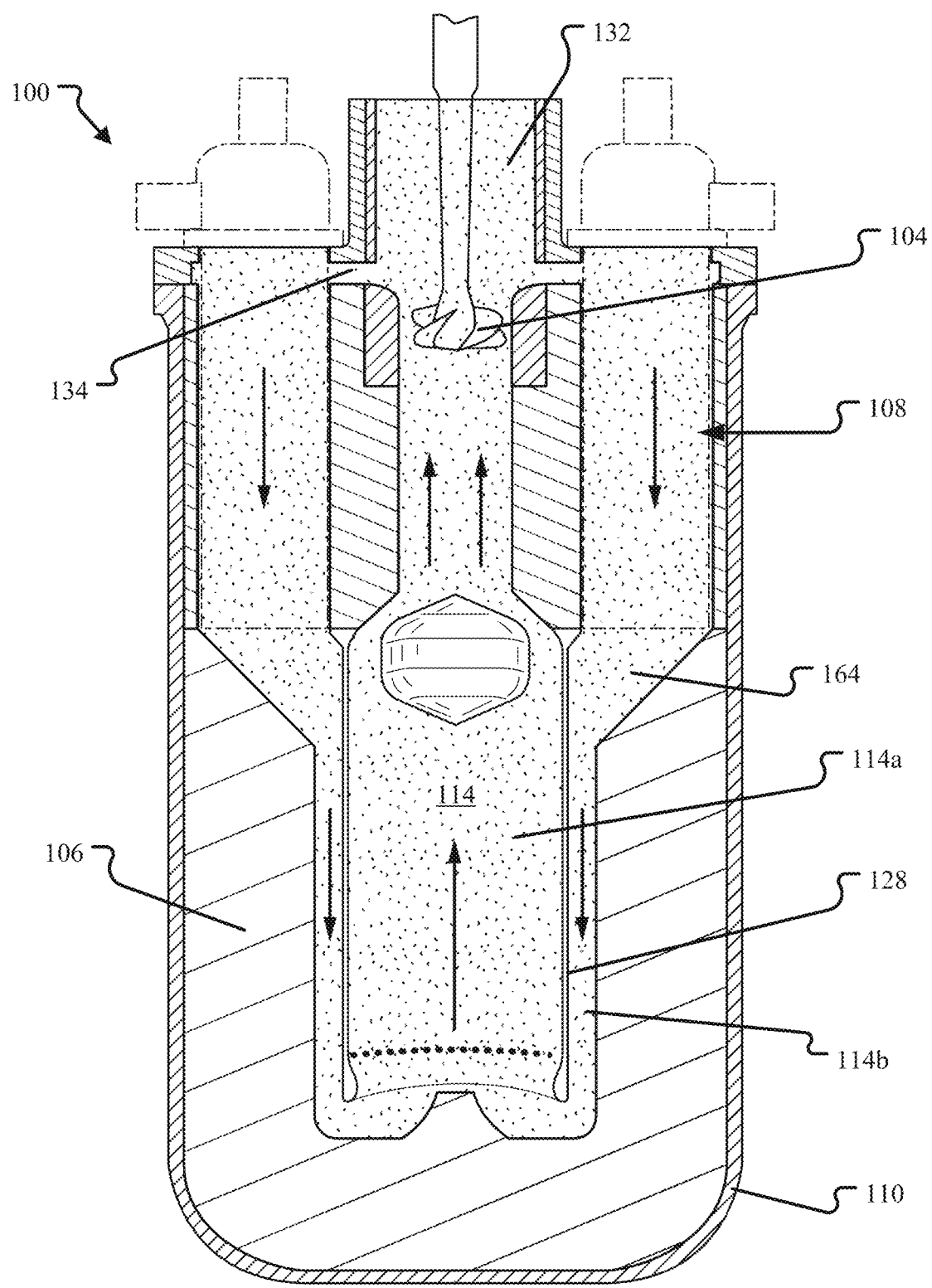

FIG. 1C illustrates a cross-section view showing the fuel salt circuit and the flow of fuel salt through the various components. The critical, 'active core' region 114 of the reactor 100 includes an open central, cylindrical chamber 114a defined by an annular draft tube 128 and the downcomer duct 114b outside of draft tube 128 (between the draft tube 128 and the reflectors 106) through which cooled fuel salt 102 flows downwardly from the PHXs 108 to be delivered to the bottom of the central chamber 114a.

This active core 114 is surrounded by a neutron reflecting material 106 on sides and bottom as well as a reflector plug 130 at the top of the core. Hot fuel salt 102 flows upwardly around the reflector plug 130 and through the central upcomer duct 118 enters the suction of the impeller 104. The reflector plug 130, which may also be referred to as a shield plug, intercepts some of the neutrons emanating from the reactor core 114 which would otherwise travel up the upcomer duct 118 and into the impeller 104 and other components above the reactor core 114. In the embodiment shown, the reflector plug 130 is larger in radius than the upcomer duct 118 and, therefore, is in the way of a majority of neutrons that would otherwise impact the upper components. The reflector plug may be shaped/sized so that it is directly between and, in conjunction with the displacement component 174 discussed below, blocks any neutrons emanating from, the entire volume of central chamber of the reactor core 114a below the reflector plug from entering the upcomer duct 118 and/or reaching the impeller 104. In an alternative embodiment, the reflector plug may be shaped/sized so that it blocks neutrons from reaching the upcomer duct from anywhere in the reactor core 114.

The impeller 104 discharges fuel salt radially into four cavities containing PHX tubes where heat is transferred from the fuel salt to the primary coolant. Exiting from the bottom of these PHX cavities, the fuel flow joins into an annular downcomer duct 114b between the draft tube 128 and the reflectors 106, re-entering the bottom of the core 114 by transiting around the bottom of the submerged draft tube 128 that separates the upward flowing core 114a from the downward-flowing annular downcomer duct 114b. Perforations 188 as shown in FIG. 1A may also be provided to control the flow of cooled fuel salt into the bottom of the central region 114a of the reactor core 114.

The salt in the reactor core 114 fissions heat and is then pumped to the primary heat exchangers 108 so that the heat can be transferred to the primary coolant salt. Criticality is established by the fuel salt 102 in the center 114a of active core 114. During operation, this active core 114 is free of any neutron moderators or moderating structural materials (with the exception of the relatively thin draft tube 128 separating the downcomer duct 114b from the central portion 114a of the active core) to preserve a fast neutron spectrum for actinide burning and fissile breeding with few parasitic adsorptions. The draft tube 128 itself may be made of a neutronically-transparent material to reduce, as much as possible, the effect on the energy of the fast neutrons in the core 114. For example, in an embodiment the draft tube may be made, in whole or in part, of silicon carbide (SiC), graphite, SiC composites, ceramic fiber composites, or ceramic matrix composites or combinations thereof.

Fission heat generated in the active core 114 is carried away by the fuel salt 102 in an actively pumped fuel salt circuit. The fuel salt flows from the active core 114 out through four parallel heat transfer legs, each of which discharge into a collector region connected to the top of the annular downcomer duct 114b. The reactor 100 inherently couples the reactor core 114 and the heat transport functions because the nuclear fuel is the heat transport fluid.

The active core 114 is unmoderated in that it contains no moderator elements. While the draft tube 128 is within the core 114, it is designed to be relatively thin and the material used is selected minimize the effect on the energy of the neutrons. As mentioned above, within the central core area 114a there are no moderators or moderating elements. This promotes the fast spectrum reaction in the core 114. Unlike other MCFR designs where the cooled fuel salt is separated from the core by a reflector or absorber so that neutrons from the cooled fuel salt are not participating in the fission reaction, the returning cooled fuel salt in the downcomer duct 114b and the heated fuel salt in the central core 114a both provide fast neutrons within the core 114.

Figure 1E:
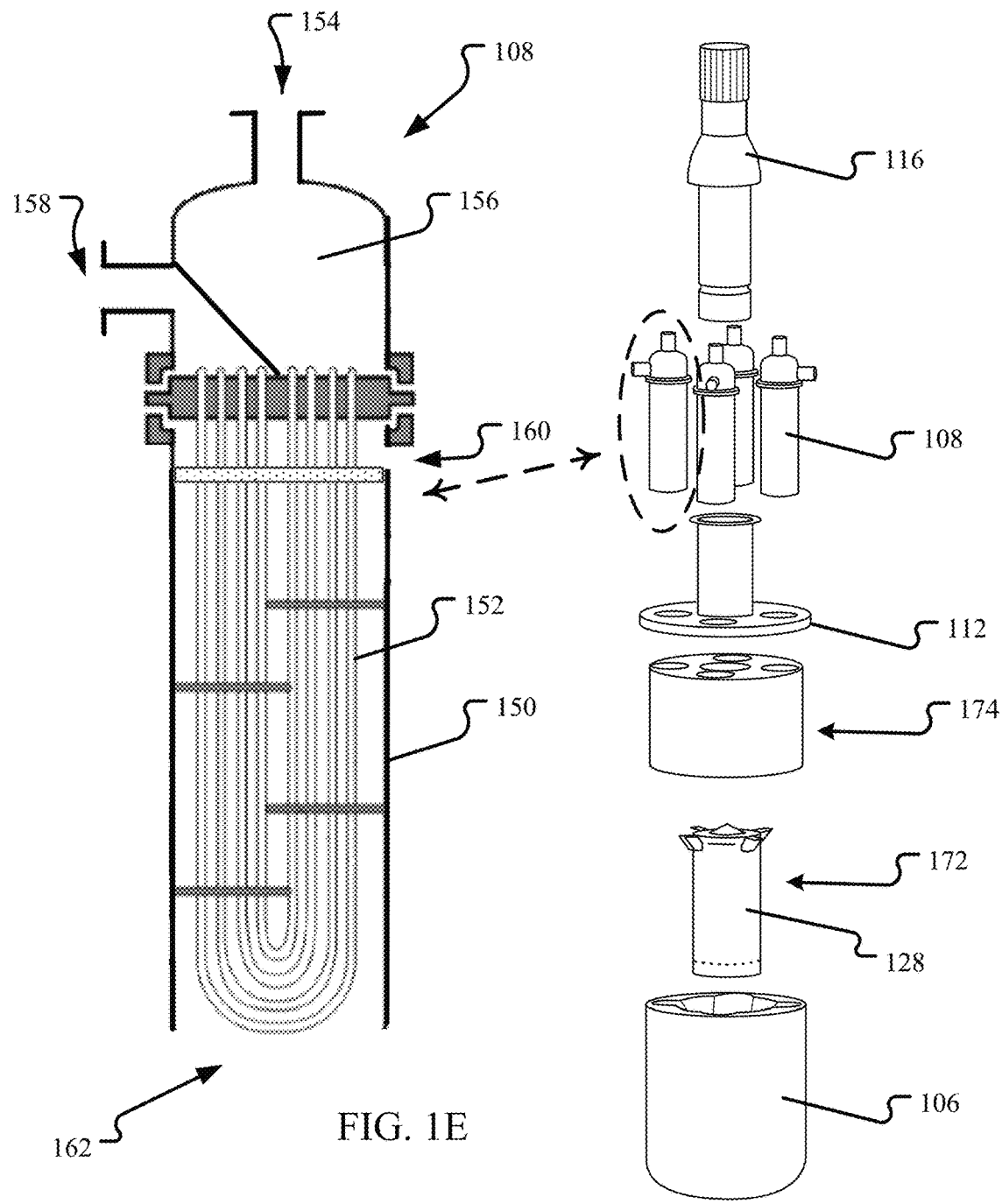
Figure 1D:
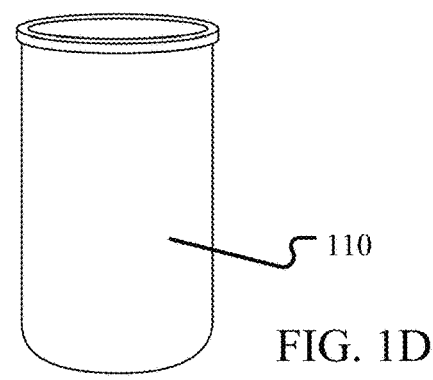
Figure 1G:
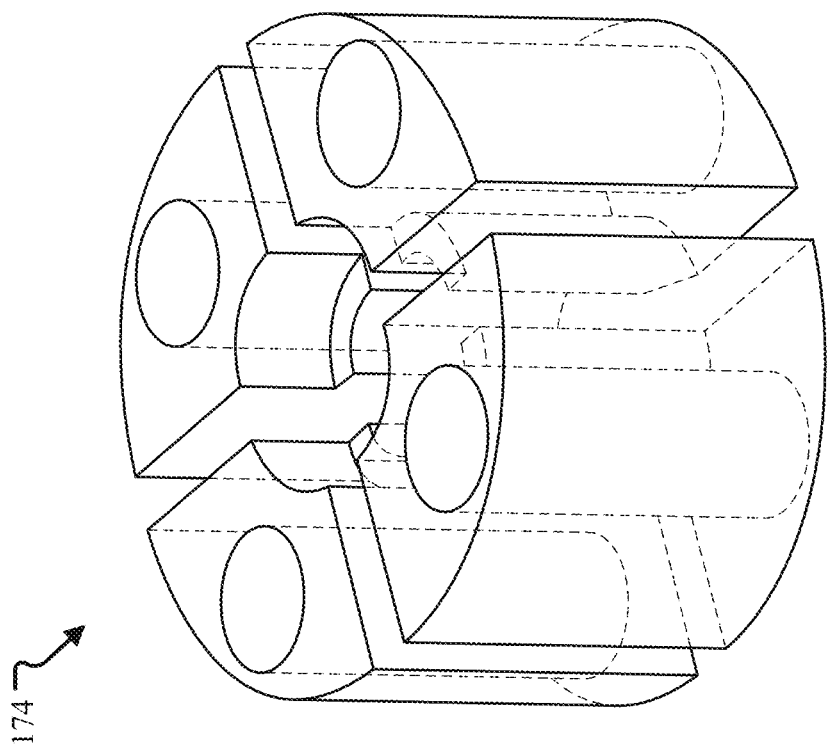
Figure 1F:
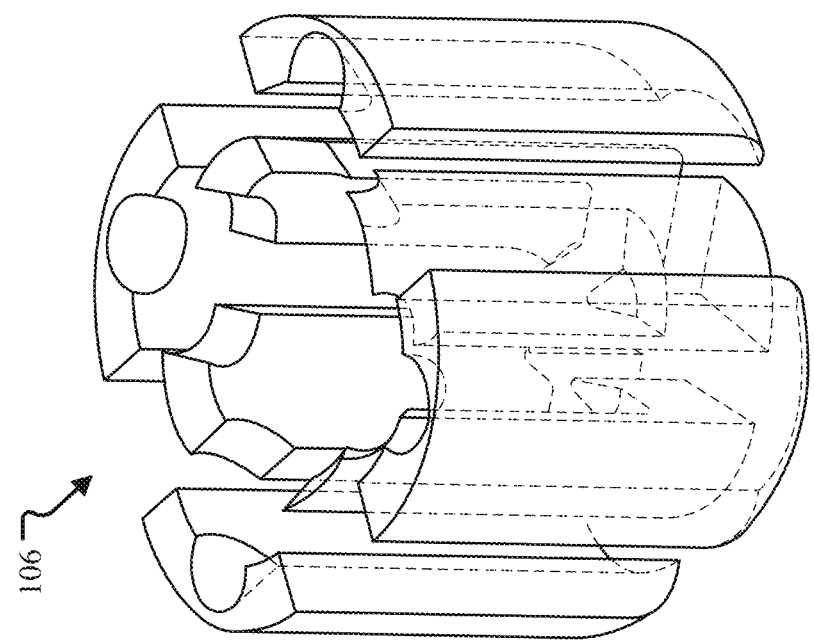

FIG. 1D illustrates and exploded view of the reactor 100 showing the different components and also illustrating how the components could be assembled and disassembled. FIG. 1D illustrates the main components of the reactor 100. The reactor 100 is designed as a set of discrete components. In the embodiment shown, the components include the reactor vessel 110; the reflector 106; a flow guide assembly 172 that incorporates the draft tube 128 and elements that form portions of the external surfaces of the outlet ducts from the heat exchangers; an upper displacement component 174 that acts to fill the volume around the heat exchangers 108; the vessel head 112; the heat exchangers 108; and the pump assembly 116.

In an embodiment, the displacement component 174 may be made of or include an amount of neutron absorbing material in order to make sure criticality only occurs in the active core 114. In an embodiment, the neutron absorbing material is $B_4C$, however any suitable neutron absorbing material may be used. Other neutron absorbing materials include: cadmium, hafnium, gadolinium, cobalt, samarium, titanium, dysprosium, erbium, europium, molybdenum and ytterbium and alloys thereof. Some other neutron absorbing materials include combinations such as $Mo_2B_5$, hafnium diboride, titanium diboride, dysprosium titanate and gadolinium titanate. In an alternative embodiment, the displacement component 174 is made of reflecting material (as described herein) or a combination of reflecting and absorbing material.

Each component illustrated can be independently manufactured off site and then shipped and easily assembled at the desired location. Because the reactor 100 is designed as a low power test reactor, these main components may be kept relatively (for a nuclear reactor) small, allowing for ease of manufacturing, transport, and assembly.

Although not shown, depending on the embodiment the reflector 106, displacement component 174, and vessel head 112 may include various smaller penetrations such as those for instruments and the control rod thimbles. In addition, depending on the embodiment the reflector 106 and displacement component 174 each may be one part, two parts, or multiple parts. For example, the reflector 106 may be two parts: a lower axial reflector and a single radial reflector. Alternatively, the reflector 106 may be multiple parts such as the eight part embodiment shown in FIG. 1F. Likewise, the displacement component 174 may be multiple parts such as the four part embodiment shown in FIG. 1G. The vessel head 112 further includes a riser tube section which contains the expansion volume and is topped with a flange for attachment to the pump assembly 116.

As mentioned above, in the embodiment shown the reactor fuel is a chloride fuel salt. In an embodiment, the initial fuel salt charged in the reactor before startup may be 20-40% $UCl_3$; 1-10% $PuCl_3$; 0.0-0.1% $AmCl_3$; and 50-80% NaCl. As soon as operation begins, the production of fission products will, of course, change the composition of the fuel salt over time. Examples of other suitable fuel salts include those described in U.S. Patent Application Publication No. 2016/0189813 titled "Molten Nuclear Fuel Salts and Related Systems and Methods" which is hereby incorporated herein by reference. In particular, fuel salts that melt at a reasonably low temperature less than 750° C. or even below 600° C. such as at or below 525° C. are suitable for use in the reactor 100.

The primary coolant salt may be any salt that is both stable at high temperatures and provided sufficient heat transfer. In the embodiment shown, the primary coolant salt is a sodium chloride-magnesium chloride eutectic. This salt is stable up to 1,400° C., and therefore able to withstand the high temperatures of the core without experiencing decomposition.

Steel components in the reactor 100, such as the vessel 110, draft tube 128, external casing of the reflectors 106, and heat exchanger components, may be made of solid steel. Because the reactor is generally designed to operate at conditions on slightly above atmospheric pressure and below 800° C., many different steel compositions are suitable. The draft tube 128 may also be a carbon or other neutronically-transparent material as discussed above to reduce the amount of energy lost by fast neutrons in the core 114 due to the interaction of the fast neutrons with the draft tube 128. Based on the operating conditions, which will at least in part be dictated by the fuel selection, any suitable high temperature and corrosion resistant steel, such as 316 stainless, HT-9, a molybdenum alloy, a zirconium alloy (e.g., ZIRCALOY™), SiC, graphite, a niobium alloy, nickel or alloy thereof (e.g., HASTELLOY™ N), or high temperature ferritic, martensitic, or stainless steel and the like may be used.

The reactor core 114 is configured to passively remove decay heat via natural circulation. Under a loss of forced flow accident the control rods (not shown) are inserted to shutdown the reactor, which terminates the fission reaction leaving only heat generated by the decay of the fission products (decay heat) to be removed. The primary heat exchangers are positioned well above the active core to establish robust, buoyancy-driven flow.

FIG. 1E illustrates an embodiment of one of the four heat exchangers 108 illustrating the various inlets and outlets, the configuration of the shell 150 and the tubes 152. In the embodiment shown, each PHX 108 is a shell-and-tube heat exchanger using a U-tube configuration. The PHX 108 has fuel salt on the shell side and primary coolant salt in the tubes 152. Cooled primary coolant salt enters the PHX from an inlet 154 into the coolant salt plenum 156 where it is distributed into the inlet ends of the tubes 152. The coolant salt flows through the tubes and exits through an outlet 158 after having been heated by the fuel salt. Fuel salt is received from the impeller via the fuel salt inlet ducts 134 and flows into the shell at the fuel salt inlet 160. In the embodiment shown, the fuel salt flow is routed by baffles between the tubes and downwardly through the volume enclosed by the shell 150 to finally exit through the bottom of the shell 150, which is open and acts as the cooled fuel salt outlet 162. In an alternative embodiment, rod supports for the tubes may be used instead of baffles. In this embodiment, grids of rod supports are provided in different locations that stabilize the tubes. The positioning of these rod supports can perform the same mixing function as the baffles while having less resistance to fuel salt flow than baffles. The open bottom 162 discharges the cooled fuel salt into a volume defined by the shape of the reflectors 106 which acts as a transfer duct 164 between the PHX 108 and the downcomer duct 114b. The primary coolant salt system pressure is maintained positive relative to the fuel salt such that any leakage in the PHX 108 ensures coolant ingress as opposed to fuel egress.

In the embodiment shown, the tubes 152 are straight-walled tubes in a simple U-tube configuration. However, this is just one embodiment of a heat exchanger tube bundle and any other tube type or tube configuration may be used in this heat exchanger 108 or any other shell-and-tube heat exchanger described herein. For example, in an embodiment tubes with helical twist, such as the tubes sold under the trademark TWISTED TUBE® which is a registered trademark of Koch Heat Transfer Company, LP, may be used. In an embodiment, used of helically-twisted tubes may obviate the need to use baffles to hold the tube bundle in place in addition to providing better heat transfer characteristics.

The neutron reflector component 106 reflects neutrons leaking from active core 114 back into the core 114 while preserving the fast spectrum and mitigating radiation damage to other in-vessel components. In an embodiment, the reactor 100 uses lead as its primary reflecting material because lead reflects neutrons with relatively little reduction in the speed of the neutrons and relatively little neutron absorption. This promotes excellent plutonium breeding in the active core 114 (breed and burn with depleted uranium feed in grid scale MCFR reactors) and high burnups. Periodic replacement of the neutron reflectors may be efficacious to limits corrosion, erosion and radiation damage. In an alternative embodiment, any neutron reflection material may be used, however.

The neutron reflectors may be made of reflector material contained within a steel reflector structure which acts as a container of the reflector material. In one aspect, the neutron reflector may be considered a large container that acts as displacement volume, i.e., it displaces salt within the reactor vessel thereby defining where the fuel salt may be in the reactor vessel. The internal volume of the reflector structures are filled, in whole or in part, with reflector material. For example, in an embodiment bricks and/or compacted powder of reflector material are contained within the reflector structures. The reflector structure may be made of steel or any other suitably strong and temperature resistant material, as described above with reference to the reactor vessel. The reflector material within the reflector structure may be Pb, Pb—Bi alloy, iron, steel, graphite, SiC, BeO, MgO, $ZrSiO_4$, PbO, $Zr_3Si_2$, and $Al_2O_3$ or any combination thereof. In an embodiment, the reflector material may be any carbide of a refractive metal, including molybdenum carbide and/or tungsten carbide.

For example, in an embodiment MgO is used as the reflector material. The reflector structures are filled with bricks (e.g., sintered bricks), compacted powder or a combination of the two. In an embodiment, the reflector structures themselves may be made of any suitable high-temperature steel such as 316 H stainless steel, Inconel 230, Inconel 600, Inconel 617, Inconel C276, Inconel 625, or any other steel or material, now known or later developed, that has sufficient strength, heat, and neutronic damage resistance for the design purpose.

Individual neutron reflector components are designed to accommodate thermal expansion mis-match and swelling, which results from change in temperature and neutron radiation. For a reflector material such as MgO, the neutron reflector fill material may be processed as a powder, which typically has a 66-90% of theoretical density limit. Secondary operations such as reduction in area from drawing and annealing, and vibratory compaction can produce higher densities.

There are several strategies for assembling the neutron reflector components into the reactor vessel. In one strategy, the reactor vessel is pre-heated using the heater(s) described above and the two part of the reflector are then inserted into the vessel. This will result in a permanent shrink fit between the reactor vessel and reflector. In a second strategy, the reflector structures are sized to a slip fit relative to the reactor vessel at room temperature. This will produce a light transitional fit at operating temperature.

In an embodiment, the neutron reflecting material is contained as a liquid within SS316 tubes coated on the outside with a high nickel alloy to manage corrosion from the fuel salt and coated on the inside with a 400 series steel to manage corrosion from the reflecting material. The lower and upper axial neutron reflectors include curved features to guide the fuel salt flow up the active core center 114a.

In the embodiment shown, the vessel head 112 provides some additional neutron reflection. In an alternative embodiment, additional reflector material may be incorporated into the vessel head or between the vessel head and the reflector 106 to act as an upper axial reflector. Likewise, external shielding (not shown) around the reactor may be provided for additional safety.

The reactivity control system adds negative reactivity to the reactor 100 to control the power level, shut the reactor down and maintain subcriticality outside of normal operation. In an embodiment, a set of eight control rods 170 (only one is shown) are inserted into control rod thimbles, or well, that create a negative space void of fuel salt—mitigating hydraulic resistance and corrosion concerns to the control rods. In an embodiment, these control rod thimbles are located just outside of the active core 114, such that the rods have high control rod worth.

To facilitate maintenance of the systems and components containing fuel salt, the reactor 100 may include a fuel drain and flush system. In contrast to other molten salt reactor designs, sufficient shutdown is provided by the characteristics of the fuel salt such that the reactor 100 does not require draining of the fuel salt from the reactor core to ensure subcriticality. This means that drain tank is not needed for reactor control and can be optimized for the performance of other functions related to fuel loading and reactor maintenance. In an embodiment, the major functions performed by the fuel salt drain tank are (1) to allow for the initial loading of the fuel salt to the reactor 100 and (2) to temporarily store the fuel salt during flushing operations and maintenance activities that require disassembly of the reactor components. The fuel salt drain tank may be equipped with heaters that are capable of melting the fuel salt after it is loaded into the system and with decay heat removal to allow for safe storage of the fuel salt following a drain of the reactor core 114 and fuel salt circuit. The geometry of the tank may be selected to ensure that the entire inventory of fuel salt can be stored in the drain tank without a possibility of criticality.

In an embodiment of the reactor operation, when the reactor is fueled is filled with fuel salt, the drain tank does not contain a significant amount of fuel salt. For initial loading of the reactor 100, the drain tank may be filled with fuel salt and the fuel salt then heated to a liquid state. Then the fuel salt may be forced into the reactor via pressurization of the drain tank using heated argon. When maintenance occurs on either the reactor or the fuel salt polishing system, these systems will need to be drained of fuel salt. A fuel salt drain is initiated by pressurizing the fuel salt circuit, for example by increasing the pressure in the headspace of the expansion volume 132.

Following the fuel salt drain, a non-nuclear flush salt may utilized to remove trace amounts of fuel salt remaining in these components. A separate flush salt system may be provided that includes a dedicated flush salt drain tank for storage and for collection of flush salt after flushing operations. In an embodiment, an initial flush of the reactor may be performed prior to initial fueling of the reactor. After contact with fuel salt, the flush salt will contain trace amounts of radioactivity and will only be removed from the reactor 100 in the same manner as fuel salt (i.e., via the fuel salt polishing system).

Due to the liquid-fueled nature of the reactor 100, a functional capability of the system design is the ability to rapidly identify the unintended transport of radioactive material (e.g., fuel salt and radioactive off-gas). The reactor 100 will have a fuel salt leak detection system that utilizes diverse and redundant instrumentation to notify the operators of a potential leak of radioactive material and to trigger automatic system responses (e.g., pump trip) to mitigate potential undesirable consequences of these leaks, when appropriate. The physical implementation of this system will include: (1) radiation monitoring of the gaseous effluents of containment structures that house components that interact with fuel salt, such as the containment building and fuel salt off-gas guard pipes; (2) radiation monitoring of primary coolant salt and off-gas; (3) a flange leak detection subsystem for flanges in systems that handle fuel salt and/or fuel salt off-gas; (4) wire-wrap and thermal imaging for localized detection of leaks; and (5) monitoring general process parameters such as vessel liquid levels, relevant differential pressures, and online gas analyzers.

In addition to the instrumentation, alarms, interlocks, and operator actions to mitigate the consequences associated with leaks, the design may include a variety of design approaches to minimize further transport of radionuclides following a leak. For example, containment structures that house fuel salt components may be maintained at a slight negative differential pressure with respect to concentric and/or adjacent containment structures. The effluent of these structures may be passed through filters to retain radionuclides and the radioactivity will be monitored in shielded enclosures. Additionally, the fuel salt may be maintained at a negative differential pressure with respect to the coolant salt in the PHXs 108; thus, in the case of a leak in the PHX, the coolant salt will leak into the fuel salt. The leak detection system may monitor for this scenario using a variety of indications, including: (1) fuel salt and coolant salt vessel level indications; (2) fuel salt temperature changes due to dilution of the fuel salt by the coolant salt; (3) PCS cover gas flow rate; and (4) fuel salt and/or coolant salt differential pressure across the PHX.

Fuel polishing will be performed on a small bypass flow of fuel salt outside of the active core 114 during normal operations. The bypass flow may be used to perform any one or more of the following:

Removal of insoluble fission products by a fuel polishing filter;

Removal of (1) dissolved noble gases, (2) volatile fission product chlorides, and (3) any gases that might accumulate in the reactor for handling by the off-gas system. This may be in addition to the removal of volatile products from the headspace above the expansion column 132 by the same off-gas system;

Addition of fuel salt (including makeup fuel salt) to the system by a fuel feed system;

Removal of fuel salt samples;

Management of the fuel salt oxidation state; and

Infrastructure to test materials in irradiating environments with the capability to insert and retrieve the material samples during operation.

The fuel feed system is designed to allow for online refueling, which enables extended operation periods when compared to reactivity limited cycles like those in modern commercial light water reactors. The capability to control the redox conditions limits the corrosion of components in contact with the fuel salt, while the ability to take samples advances the knowledge base surrounding radiation enhanced corrosion and radiation damage to MCFR components.

A fuel polishing system is provided to filter and cleanup (i.e., "polish") the fuel salt of impurities, including volatile and noble metal fission products. This approach to cleaning up the fuel salt will not separate actinides from the fuel salt. During normal operation of the reactor 100, a small recirculating flow is circulated through the polishing system by a dedicated fuel polishing pump. Fuel salt enters the fuel polishing loop via the weir line on the reactor core 114. The fuel salt flows into a fuel polishing degassing vessel, where dissolved gases are separated from the fuel salt. The process for removing the dissolved gases from the fuel salt in the degassing vessel incorporates the same technology utilized by the aluminum casting industry. The vapor from the degassing vessel flows through a "scrubber" (or direct contact cooler), which will remove any fissile material from the gases entering the off-gas system. After the entrained gas has been separated from the fuel salt, it is pumped through the fuel polishing filter to remove insoluble impurities before the polished salt is returned to the core.

The fuel polishing system can be drained to the fuel salt drain tank by the thawing of a freeze valve in the drain line at the low point of the polishing system, and the heat balance of the fuel salt in the polishing system is maintained through the operation of fuel polishing heaters and decay heat removal equipment. The sampling and monitoring components interfaces with the fuel polishing system and allows for the removal of fuel salt samples via cask.

Figure 2A:
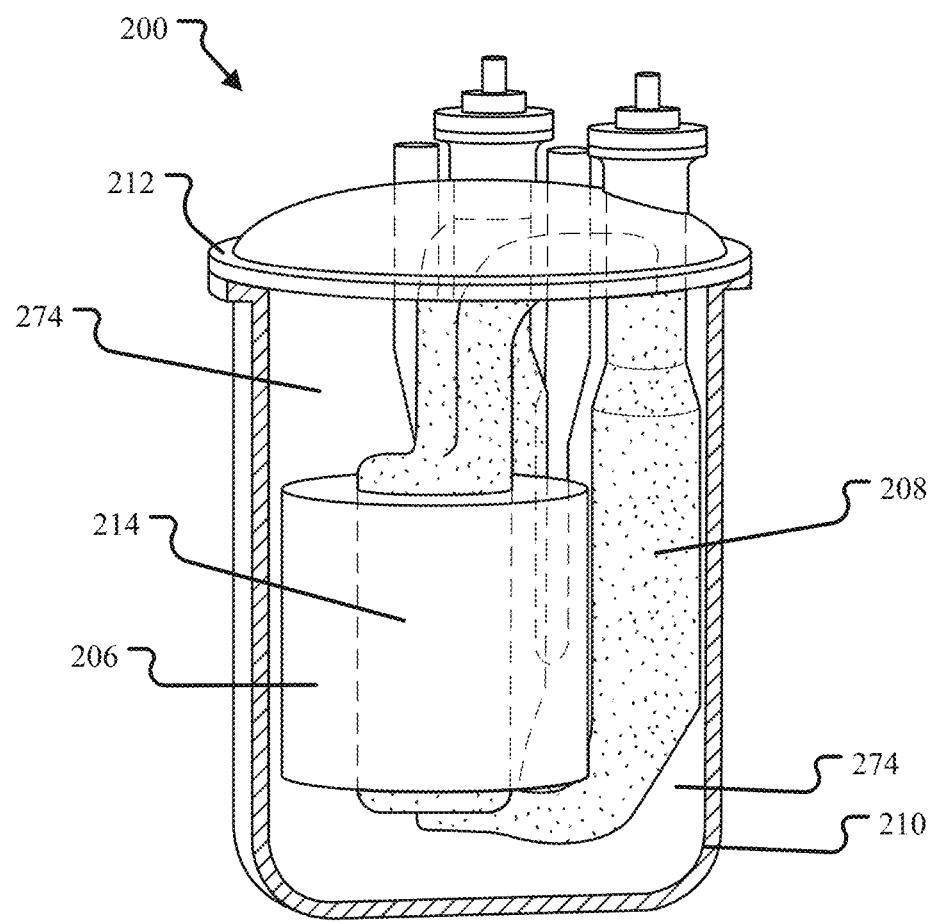
FIGS. 2A-2C illustrate an alternative embodiment of a reactor with two heat exchangers.
Figure 2B:
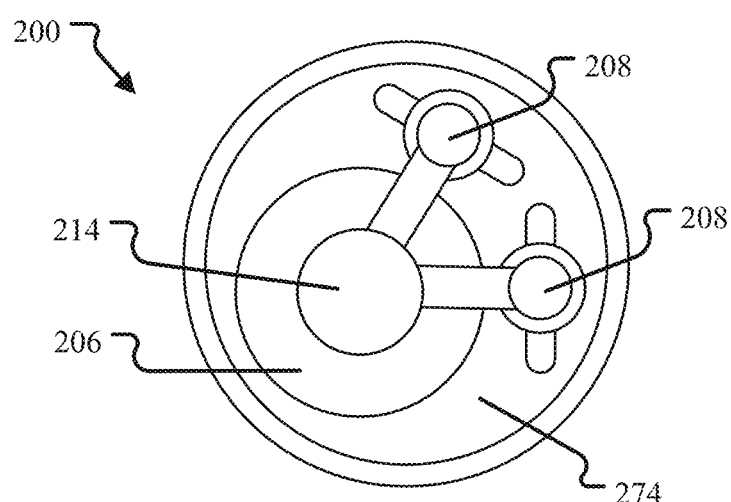
Figure 2C:
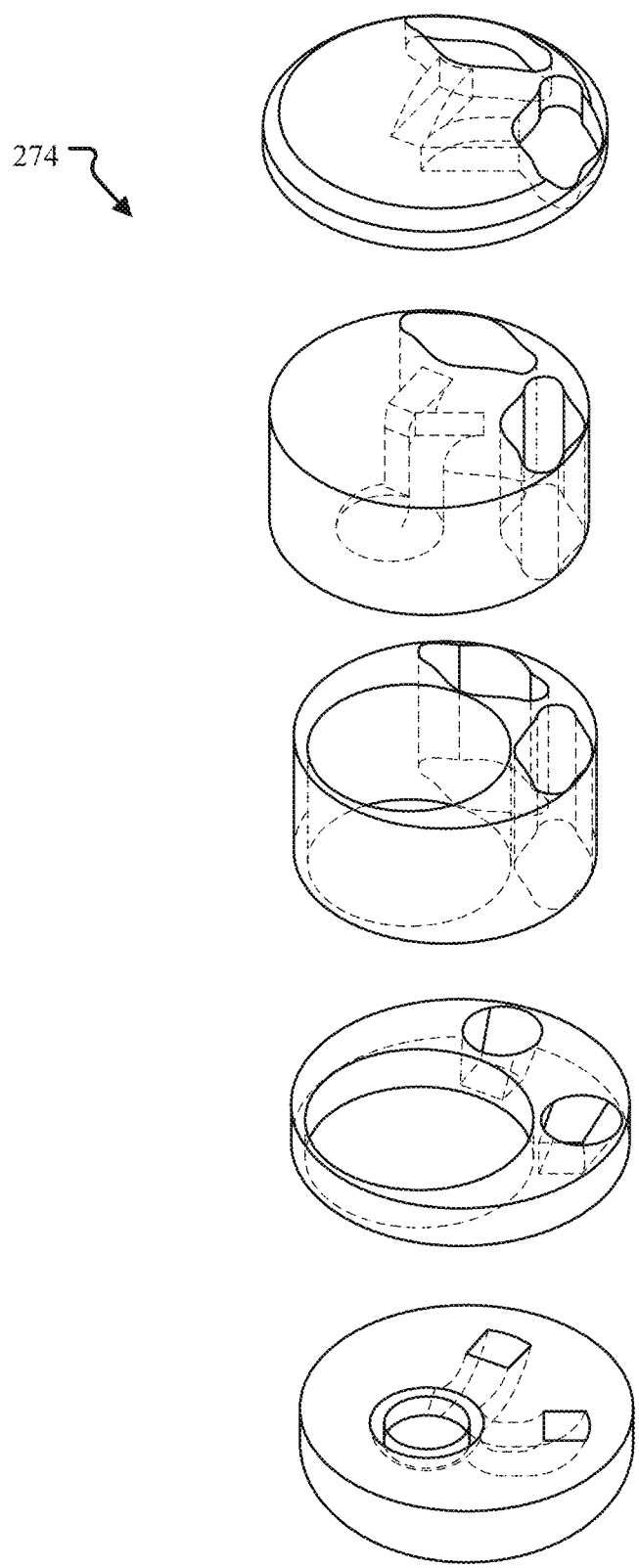

FIGS. 2A-2C illustrate an alternative embodiment of a reactor with two heat exchangers. FIG. 2A is a transparent view from the side of the pool-type reactor 200 showing the active core 214 surrounded by a radial reflector 206 that transfers fuel salt to two PHXs 208, all within a vessel 210 and capped by a vessel head 212. FIG. 2B is a top view of a cross section of the reactor 200. In the embodiment shown, the PHXs are cross flow heat exchangers receiving cold coolant salt from one side of the exchanger which then flows through an orifice plate into the shell (the orifice plate serving to distribute the flow evenly into the shell, then between the tubes horizontally to the other side of the heat exchanger where it is collected from another orifice plate and removed from the reactor 200. The fuel salt exits the active core 214 and is transferred laterally through transport ducts to the top of the shell of the PHXs where it flows downward through the interior of the tubes, out through the bottom of the PHXs and back to the base of the active core 214. FIG. 2C illustrates the various displacement components 274, which may be neutron absorbing material, that could be assembled to create the reactor 200.

Figures 3A, 3B:
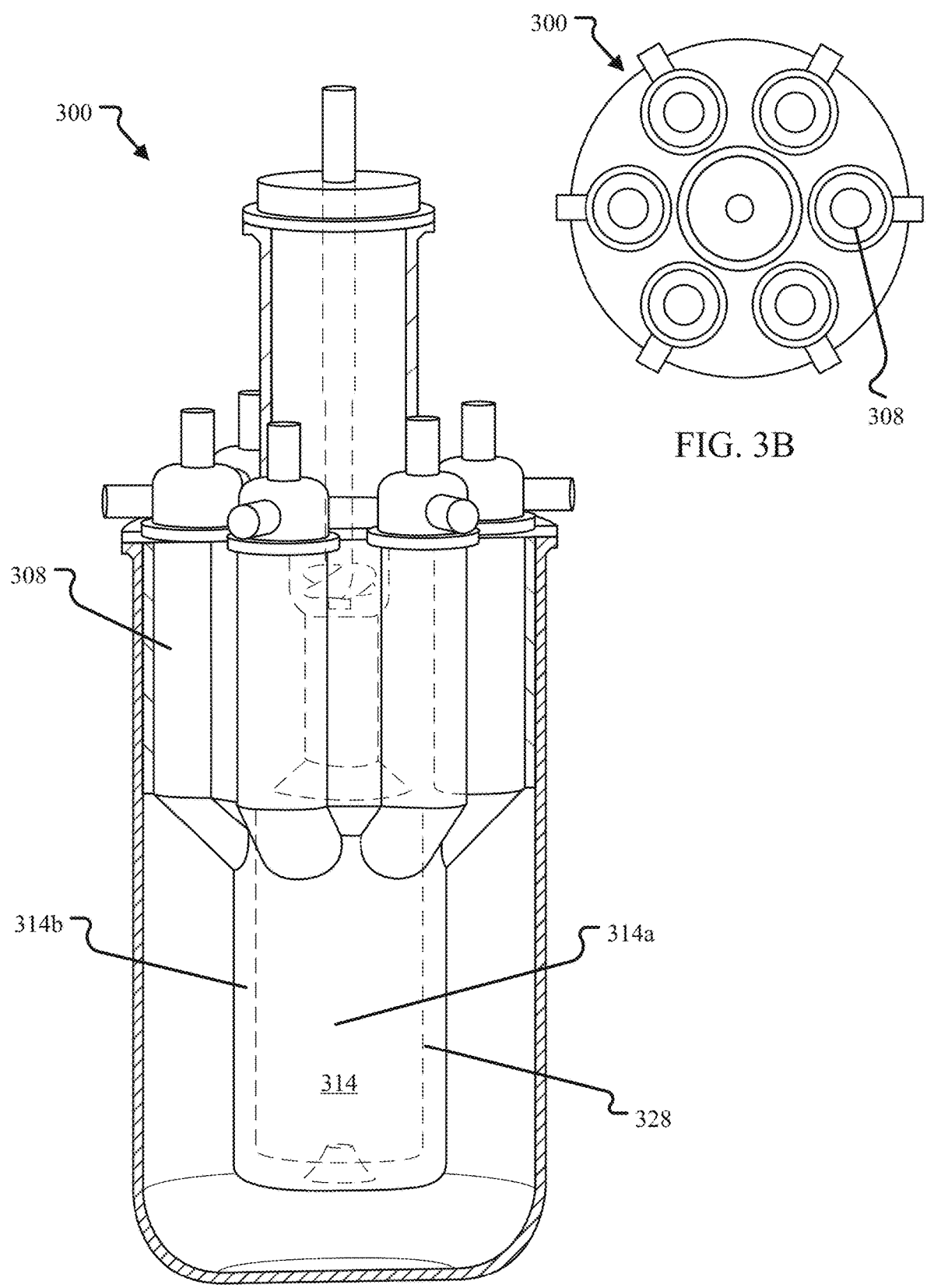
FIGS. 3A-3F illustrate a six heat exchange embodiment of a test reactor.
Figure 3C:
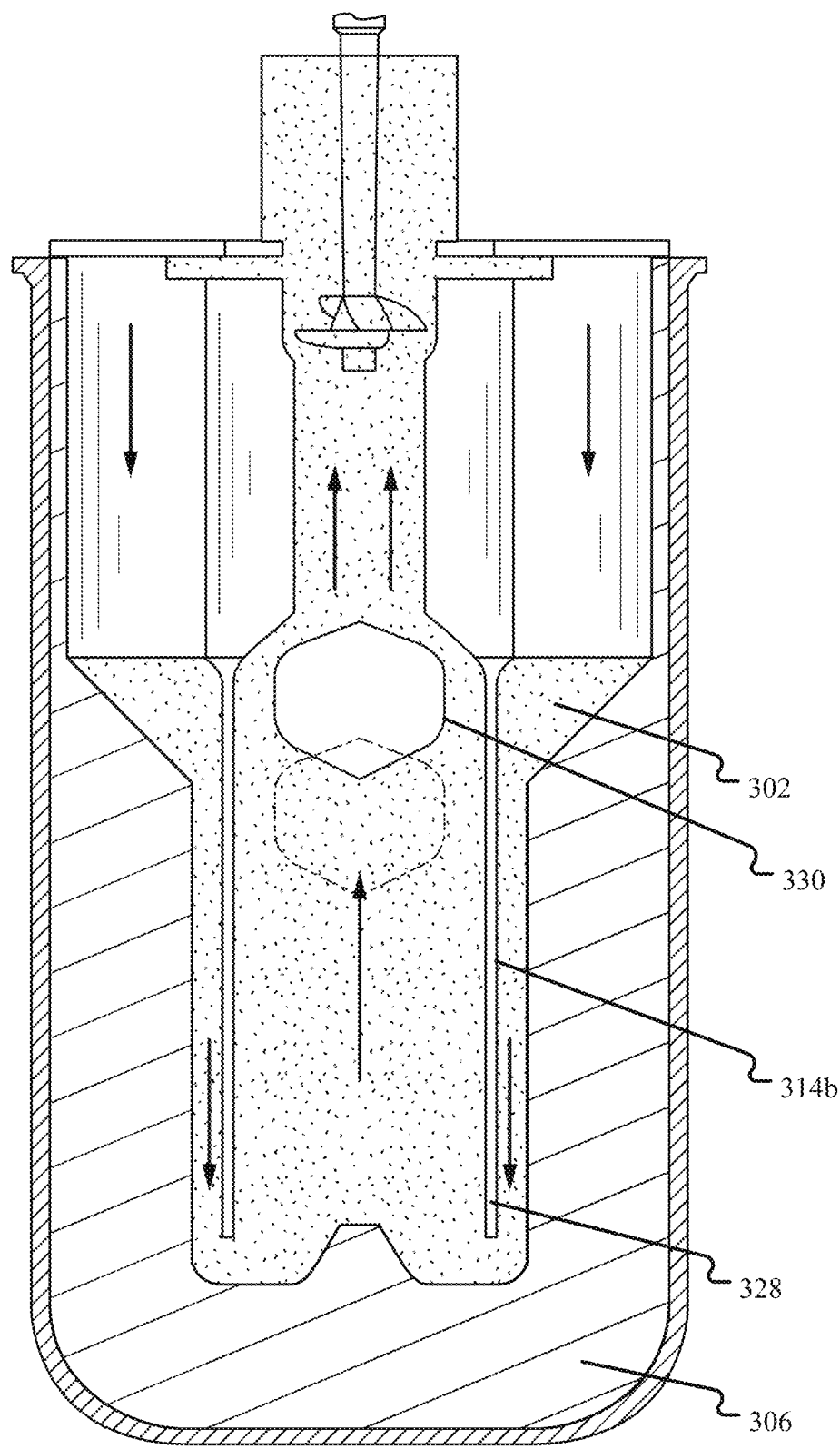
Figure 3D:
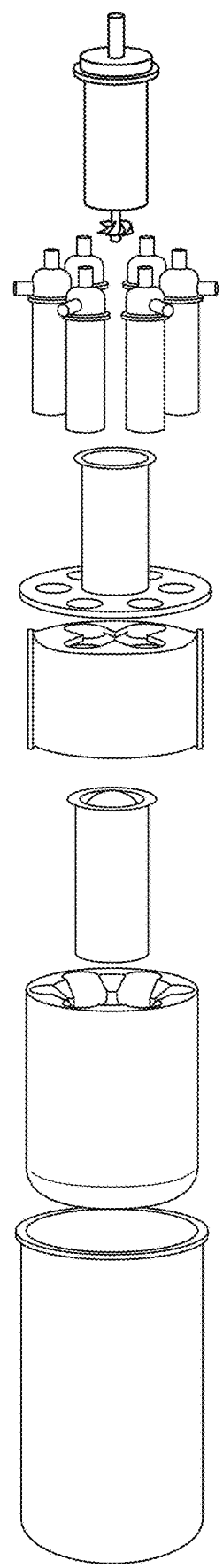
Figure 3F:
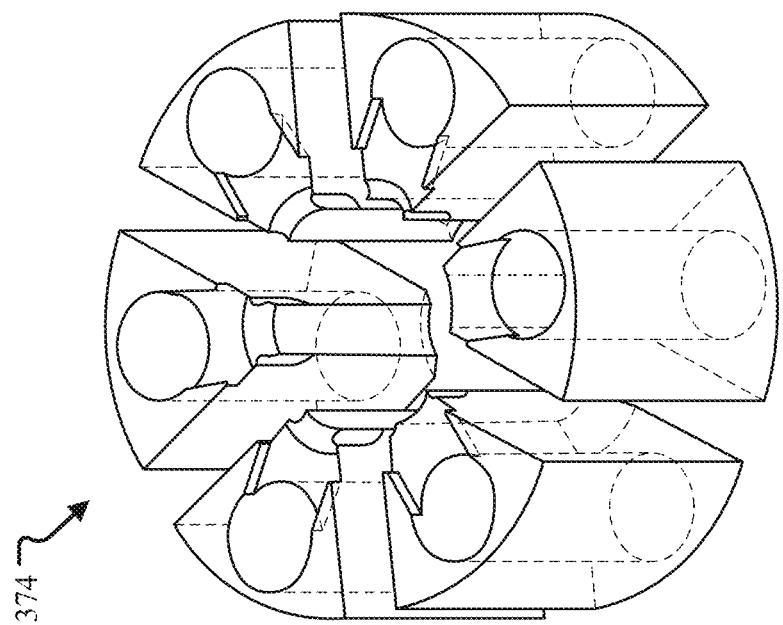
Figure 3E:
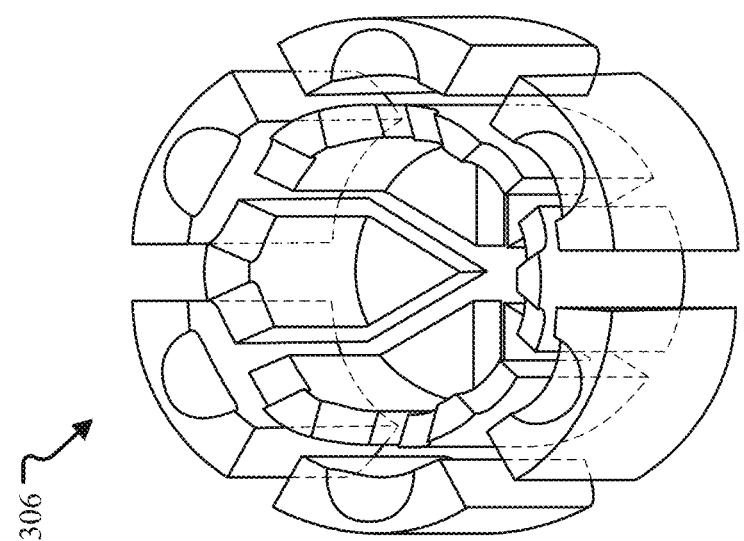

FIGS. 3A-3F illustrate a six heat exchange embodiment of a test reactor. The embodiment shown is substantially the same as that of FIGS. 1A-1G with the main difference being that six PHXs 308 are used in the reactor 300 instead of four. Again, the active core 314 includes both a central core region 314a through which the heated fuel salt rises and the fuel salt in a downcomer duct 314b. In the embodiment shown, the reflector 306 is illustrated as being twelve different parts (FIG. 3E) while the displacement component 374 is shown as six different parts (FIG. 3F).

Another feature illustrated in FIG. 3C is a vertically moveable reflector plug 330. Similar to the design described in FIG. 1C, FIG. 3C illustrates a cross-section view showing the fuel salt circuit and the flow of fuel salt through the various components. The critical, 'active core' region 314 of the reactor 300 includes an open central, cylindrical chamber 314a defined by an annular draft tube 328 and the downcomer duct 314b outside of draft tube 328 (between the draft tube 328 and the circumferential reflectors) through which cooled fuel salt 302 flows downwardly from the PHXs 308 to be preheated (through both fission and conductive heat transfer through the wall of the draft tube 328) and delivered to the bottom of the central chamber 314a. This active core 314 is surrounded by a neutron reflecting material 306 on sides and bottom as well as a reflector plug 330 at the top of the open chamber 314a.

In the embodiment shown, the reflector plug 330 is vertically moveable from a top position to a lower position within the central chamber 314a. Lowering of the reflector plug 330 displaces fuel salt in the chamber 314a and, thereby, reduces the reactivity of the reactor. Thus, the moveable reflector plug 330 is, in effect, a control rod that can be used to control the reactivity of the reactor. In this embodiment, the reflector plug 330, then, both protects the equipment above it by reflecting neutrons from the core 314 back down into the core, as well as acting a control rod to control the reactivity of the reactor.

Movement of the reflector plug 330 may be achieved by any conventional fashion used for control rods. For example, in an embodiment one or more rods may penetrate the vessel head and attach to the reflector plug 330, which may then be raised and lower through manipulation of the rods. Other mechanism are also possible and any suitable means may be used herein.

In yet another embodiment, the reflector plug 330 is made of different materials in order to provide reflection of neutrons back into the reactor core 314 but absorption of neutrons that originate from above the reflector plug 330. For example, in an embodiment the reflector plug 330 is constructed like the reflectors and includes a steel structure within which is reflecting material and absorbing material. The upper portion of the plug that faces the upcomer is filled with absorbing material while the lower portion facing the reactor core is filled with reflecting material. Other alternatives are also possible to provide the same effect of absorbing the neutrons incident on the plug from above while reflecting neutrons incident from below. For example, a layer of neutron absorbing material may be on the upper surface of the structure of the reflector plug. Likewise, a layer of reflecting material may be on the lower surface of the structure.

Figure 4B:
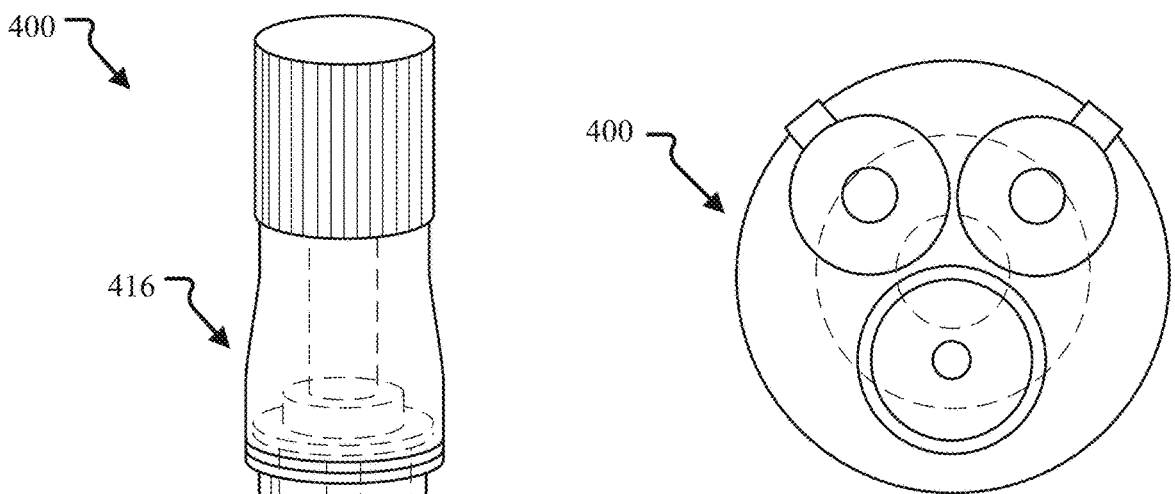
FIGS. 4A-4F illustrate another embodiment of a two heat exchanger reactor.
Figure 4A:
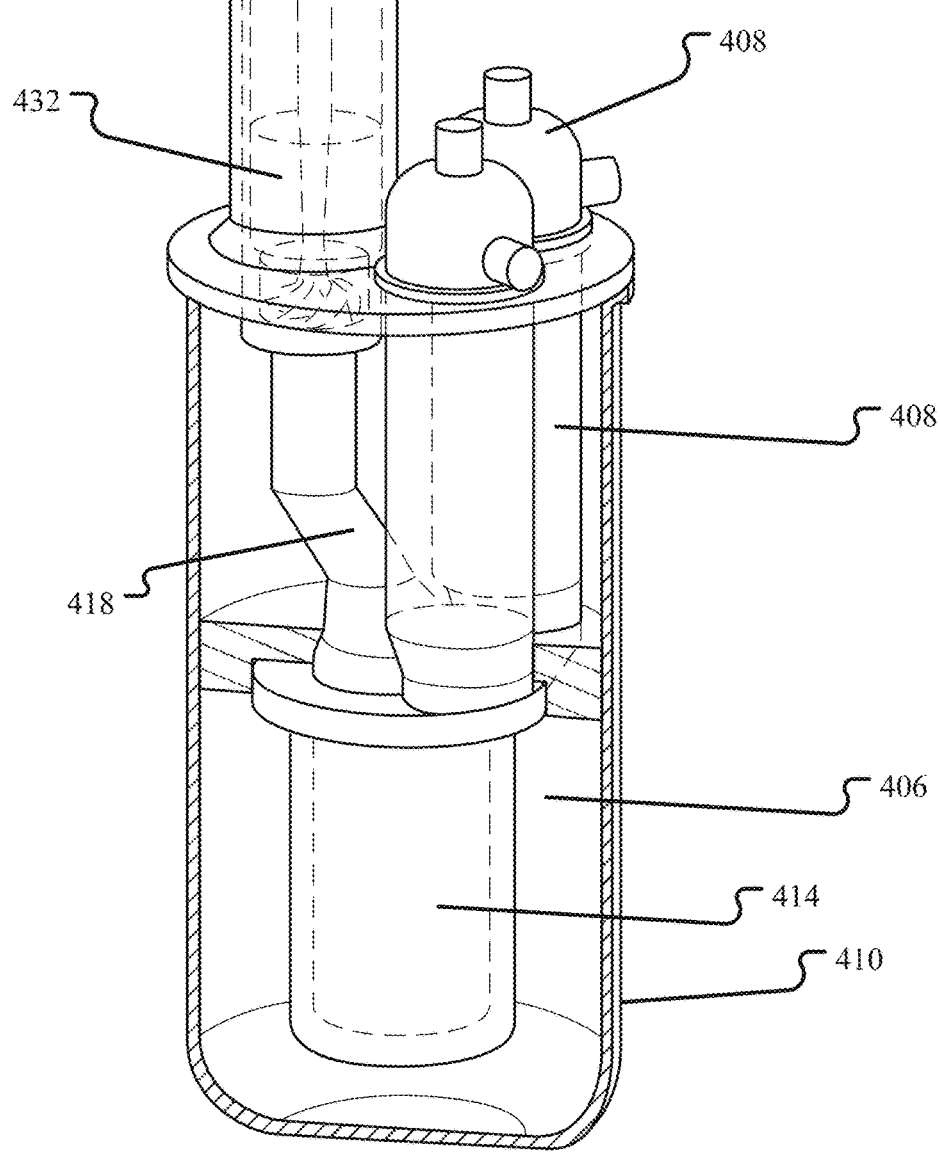
Figure 4C:
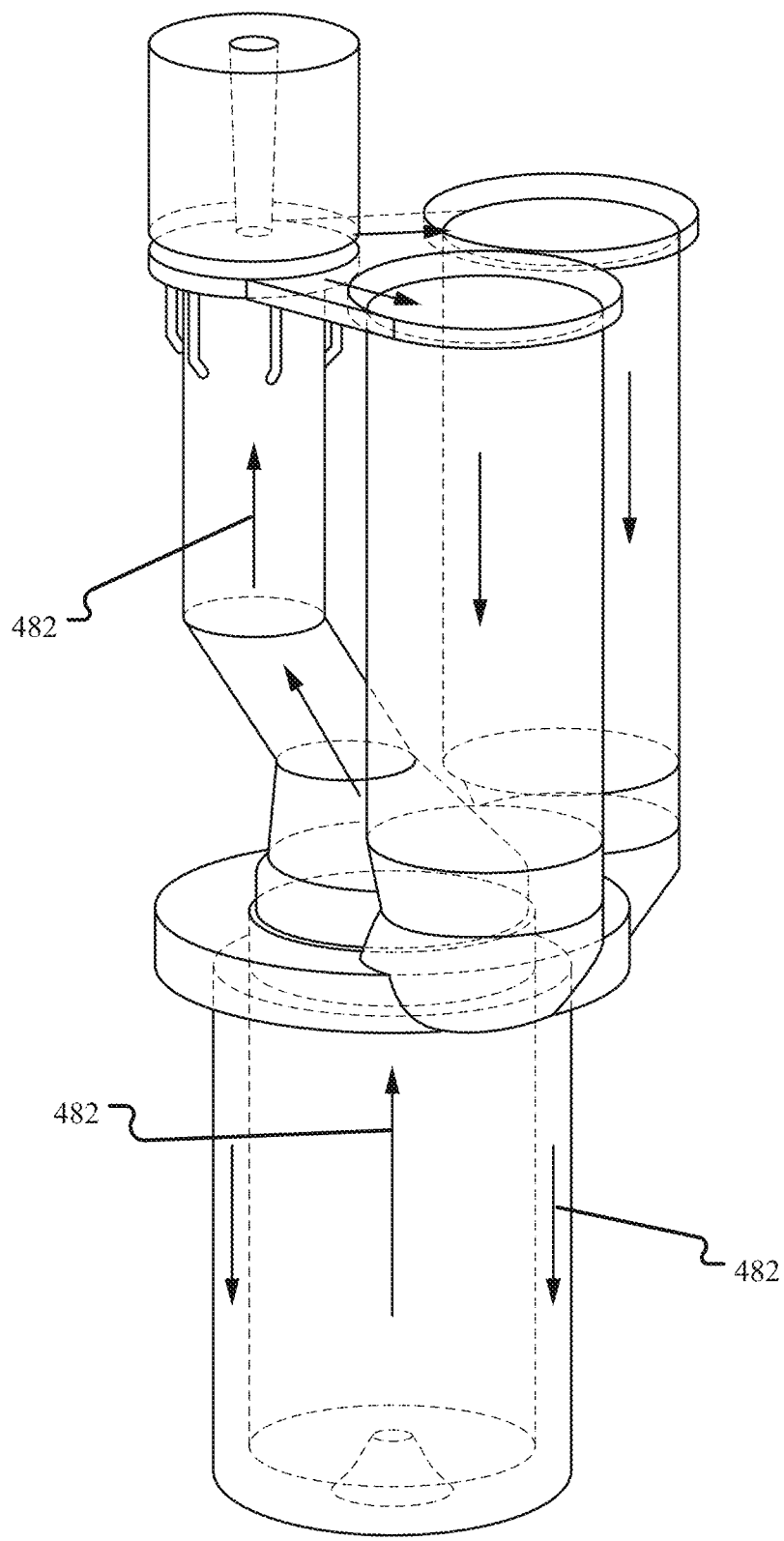
Figure 4D:
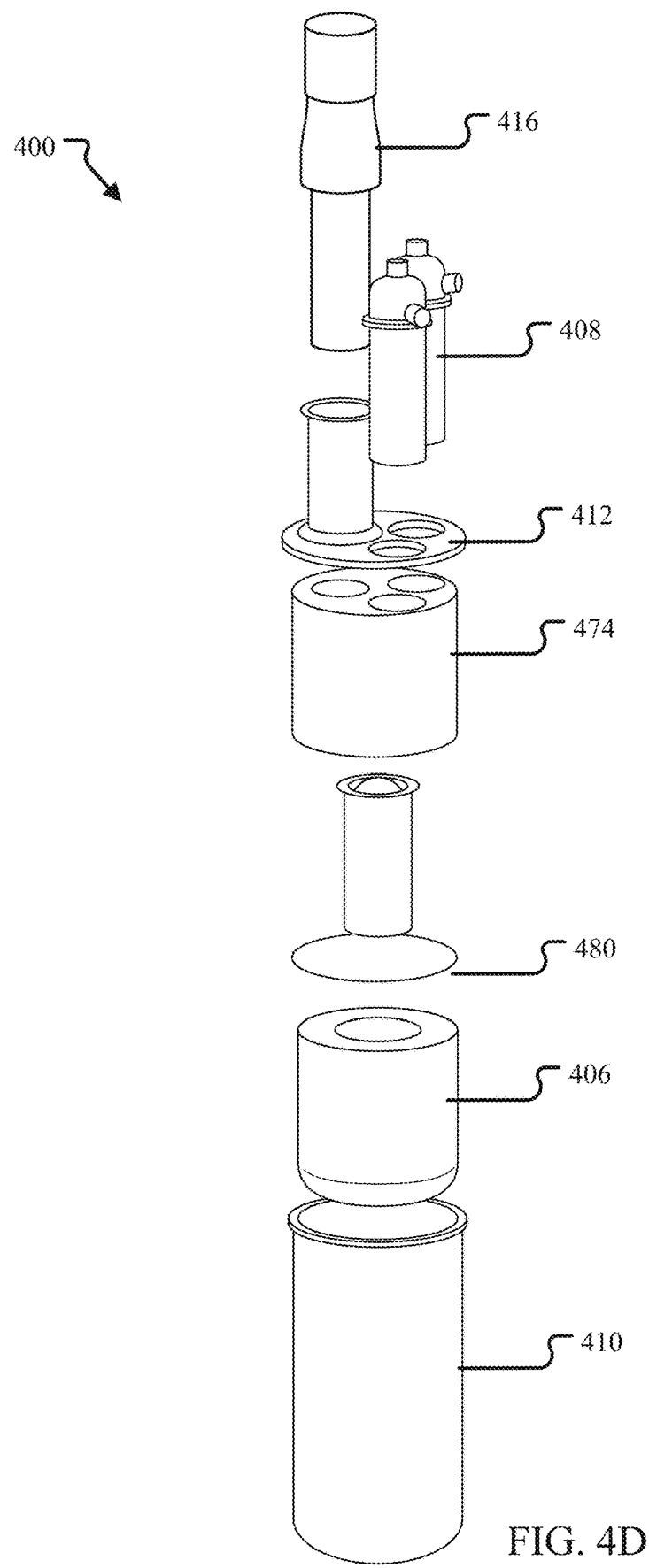
Figure 4F:
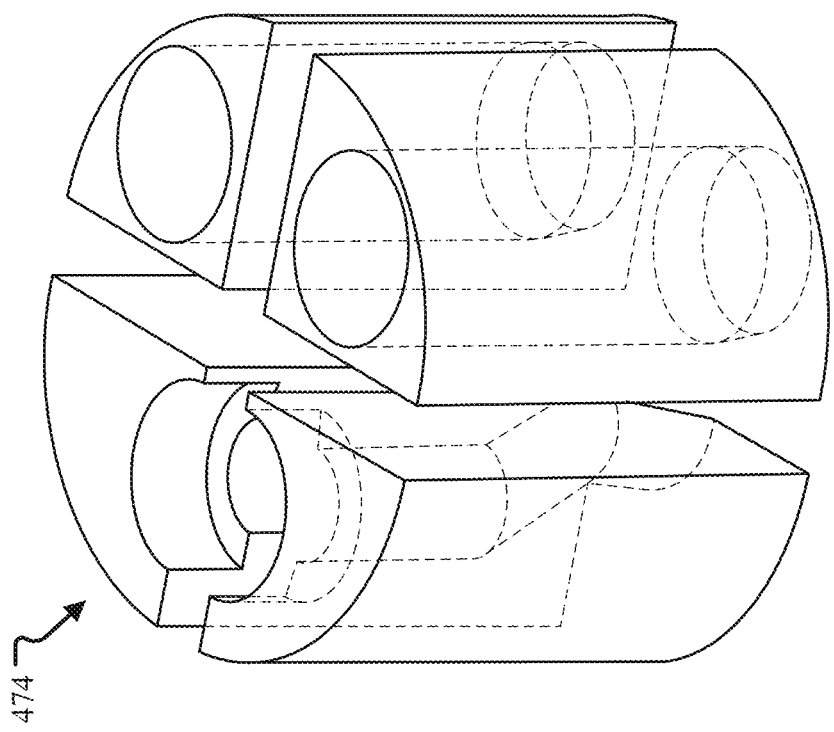
Figure 4E:
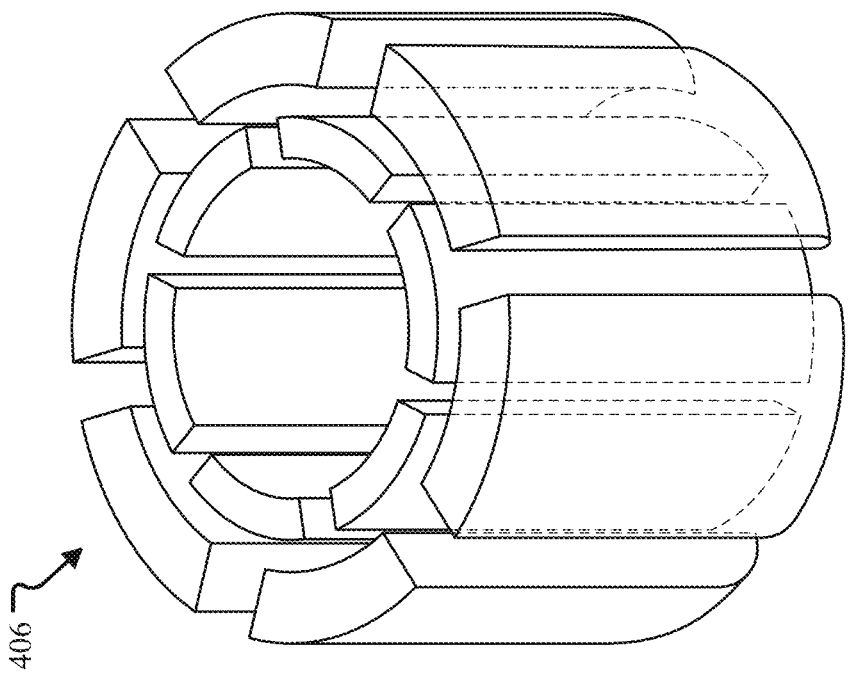

FIGS. 4A-4F illustrate another embodiment of a two heat exchanger reactor. The embodiment shown is substantially the same as that of FIGS. 1A-1G with the main difference being that two PHXs 408 are used in the reactor 400 instead of four. The PHXs 408, reactor core 414, neutron reflectors 406, pump assembly 416, and vessel 410 are substantially identical to those in FIGS. 1A-1E. The vessel head 412 is reconfigured for two PHXs but is otherwise the same as shown with respect to FIG. 1A. The displacement component 474 is changed to accommodate an offset expansion column 432 by adjusting the upcomer duct 418. The arrows 482 in FIG. 4C illustrates the fuel salt circuit and indicate the direction of salt flow within the circuit. FIG. 4D illustrates an exploded view of the components of the reactor 400. This embodiment includes an upper axial reflector component 480 not shown as part of the earlier designs. FIG. 4E illustrates one embodiment of the components of the reflector 406 and FIG. 4F illustrates how the displacement component 474 could be created using four parts.

Figure 5:
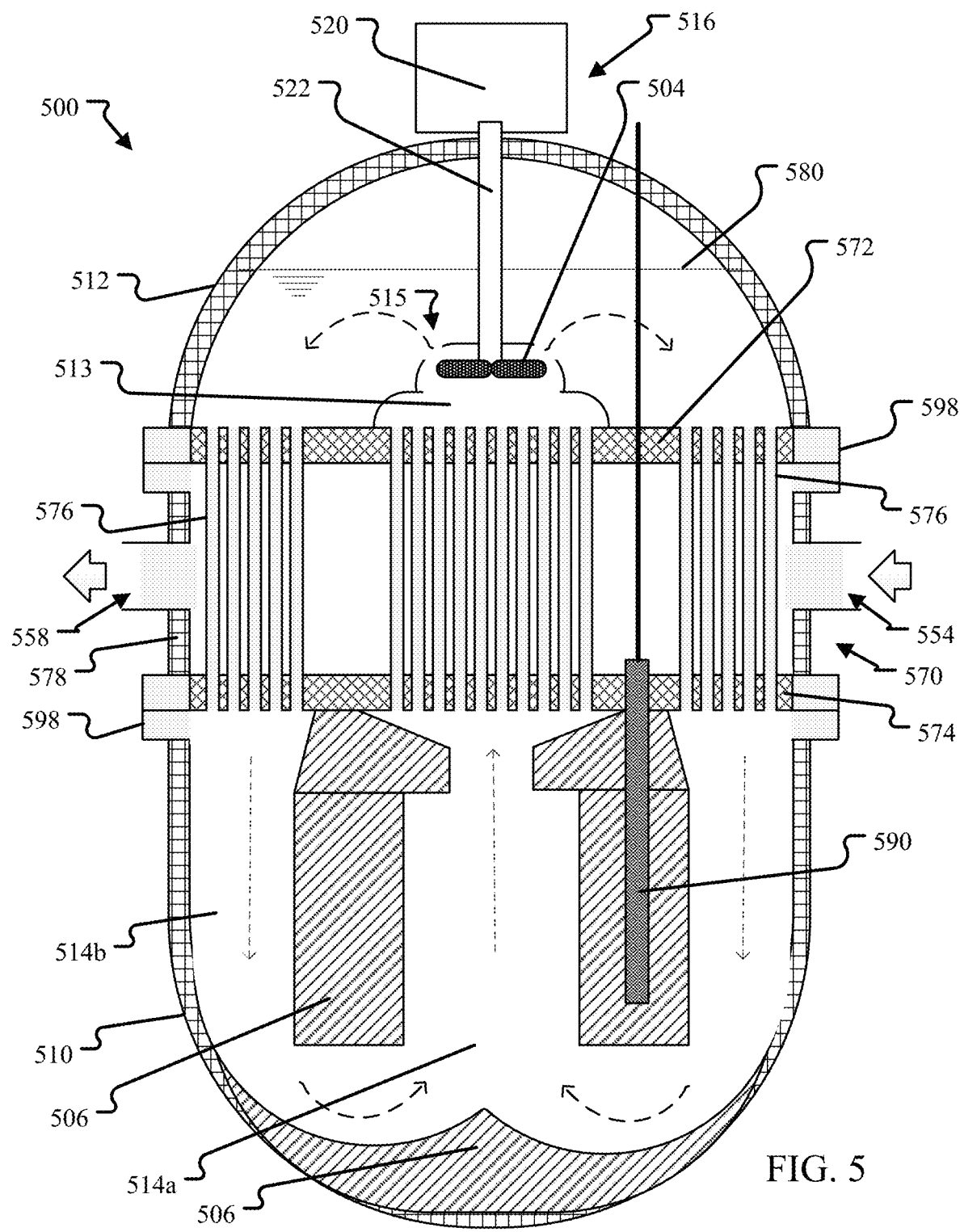
FIG. 5 illustrates a cross-section view of yet another embodiment of a test reactor.

FIG. 5 illustrates a cross-section view of yet another embodiment of a test reactor. In this embodiment, the reactor consists of three sections, a lower vessel 510, a heat exchanger section 580, and a vessel head 512. The heat exchanger section 580 is between the lower vessel 510 and the vessel head 512 and illustrated as connected to each by flanges 598, although any connection method may be used.

Direction of fuel salt flow is illustrated by the dashed lines. In the embodiment shown, reflectors 506 also function as a draft tube that separates downwardly flowing fuel salt in the downcomer duct 514b from the central reactor core 514a so that, in this embodiment, the downwardly flowing fuel salt does not provide neutrons to the central reactor core 514a, thus the active portion of the reactor core is limited to the central core volume 514a.

The heat exchanger section 570 includes an upper tubesheet 572, a lower tubesheet 574 and lateral side wall 578, the three of which act as a shell of a shell and tube heat exchanger. The tubesheets are penetrated by a number of vertical tubes 576 through which the fuel salt flows. In the center of the reactor 500, the fuel salt is flowing upwardly through the tubes 576 and at the periphery of the reactor the fuel salt is flowing downwardly. Through the shell side of the heat exchanger section 570 is flowed a primary coolant. The primary coolant can be liquid or gas. For example, in an embodiment the primary coolant is nitrogen. In the embodiment shown, the primary coolant is flows through the shell from coolant inlet 554 to the coolant outlet 558.

Similar to the prior designs, a pump assembly 516 is provided including motor 520 that drives a shaft 522. The shaft 522 penetrates the vessel head 512 and extends into a pump plenum 513 where it ends in an impeller 504. Rotation of the impeller 504 causes fuel salt to be driven upward out of the center tubes into the pump plenum 513 and out through plenum discharge ports 515.

Fuel salt does not completely fill the vessel head 512, but rather leaves a head space above the fuel salt level 580. The head space acts as an expansion volume similar that described above so that the vessel head 512 also acts as an expansion column.

Control rods 590 may be provided. In the embodiment shown a control rod is shown in a shutdown position within a reflector 506. The control rod 590 may be raised into the heat exchanger section 570. In an embodiment, the control rod 590 may be raised into the vessel head 512.

Figure 6:
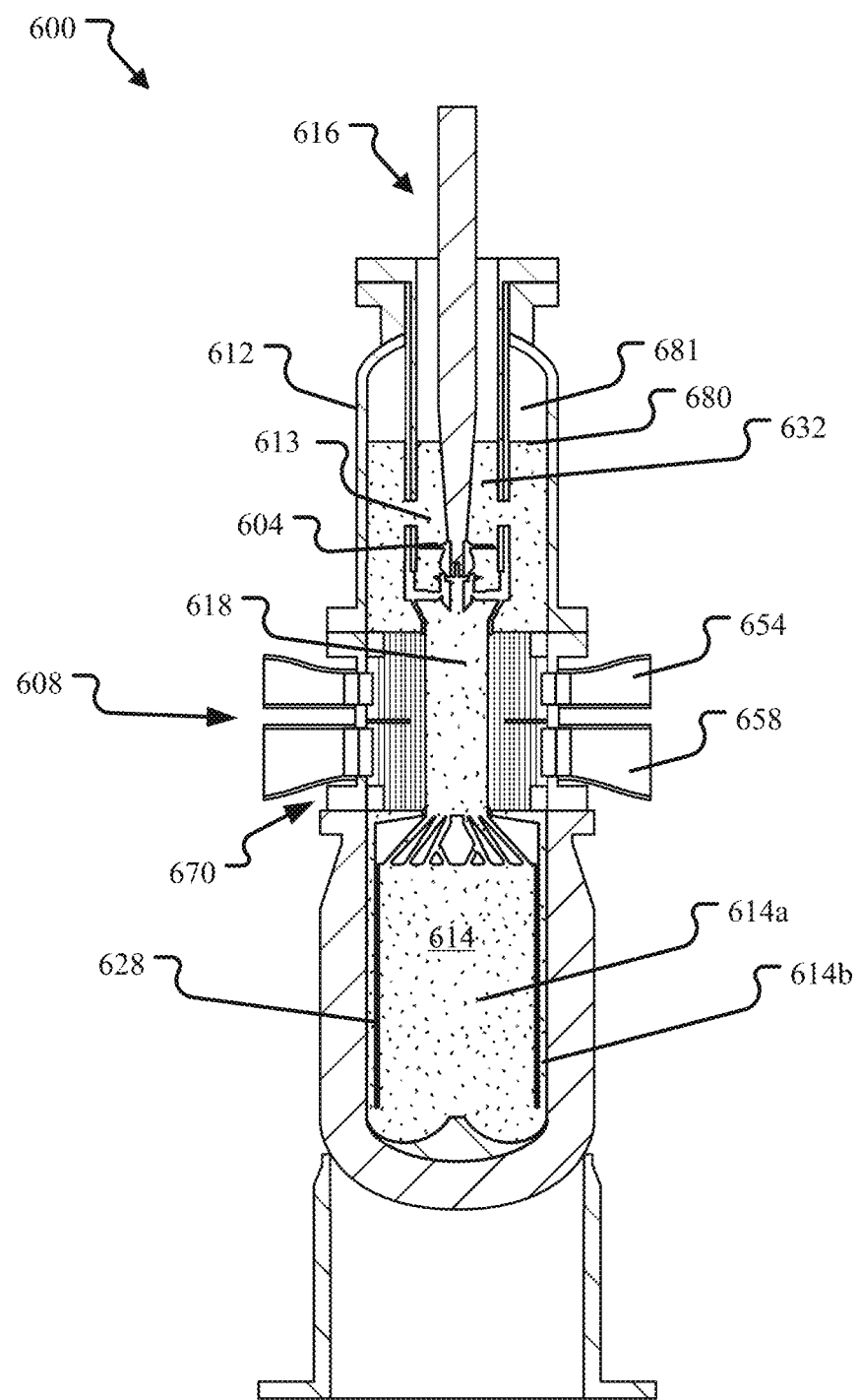
FIG. 6 illustrates a cross-section view of yet another embodiment of a test reactor.

FIG. 6 illustrates a cross-section view of yet another embodiment of a test reactor. The reactor 600 includes a downcomer duct 614*b* separated from the central region 614*a* of the active core 614 by a draft tube 628 resulting in a reactor core 614 similar to the design in FIGS. 1A-1G. In this embodiment, the primary heat exchangers 608 are located in a heat exchanger section of the vessel 670 in an annulus around the upcomer duct 618 in the center of the reactor 600. The heat exchanger 608 configuration is similar to the embodiment shown in FIG. 5 with the exception that the upcomer duct 618 does not contain a heat exchanger.

A pump assembly 616 is provided as described with respect to FIG. 5 that includes an impeller 604 that draws fuel salt upwardly into a pump plenum 613 where it is redirected to the periphery of the reactor vessel head 612 and downward into the tubes of the heat exchanger 608. Primary coolant enters the heat exchanger laterally through either an upper access port 654 or a lower access port 658 and exits through the other access port depending on whether a counter-current or co-current heat exchanger 608 is desired. The heat exchanger could utilize other configurations of cross-shell flow of coolant by varying where around the heat reactor vessel section the coolant is injected and where it is removed.

As with FIG. 5, the vessel head 612 shown in FIG. 6 includes a headspace 681 above the fuel salt level 680 so that the vessel head 612 also acts as an expansion column 632. The headspace 681 may be filled with pressurized inert gas such as argon or nitrogen.

Figure 7:
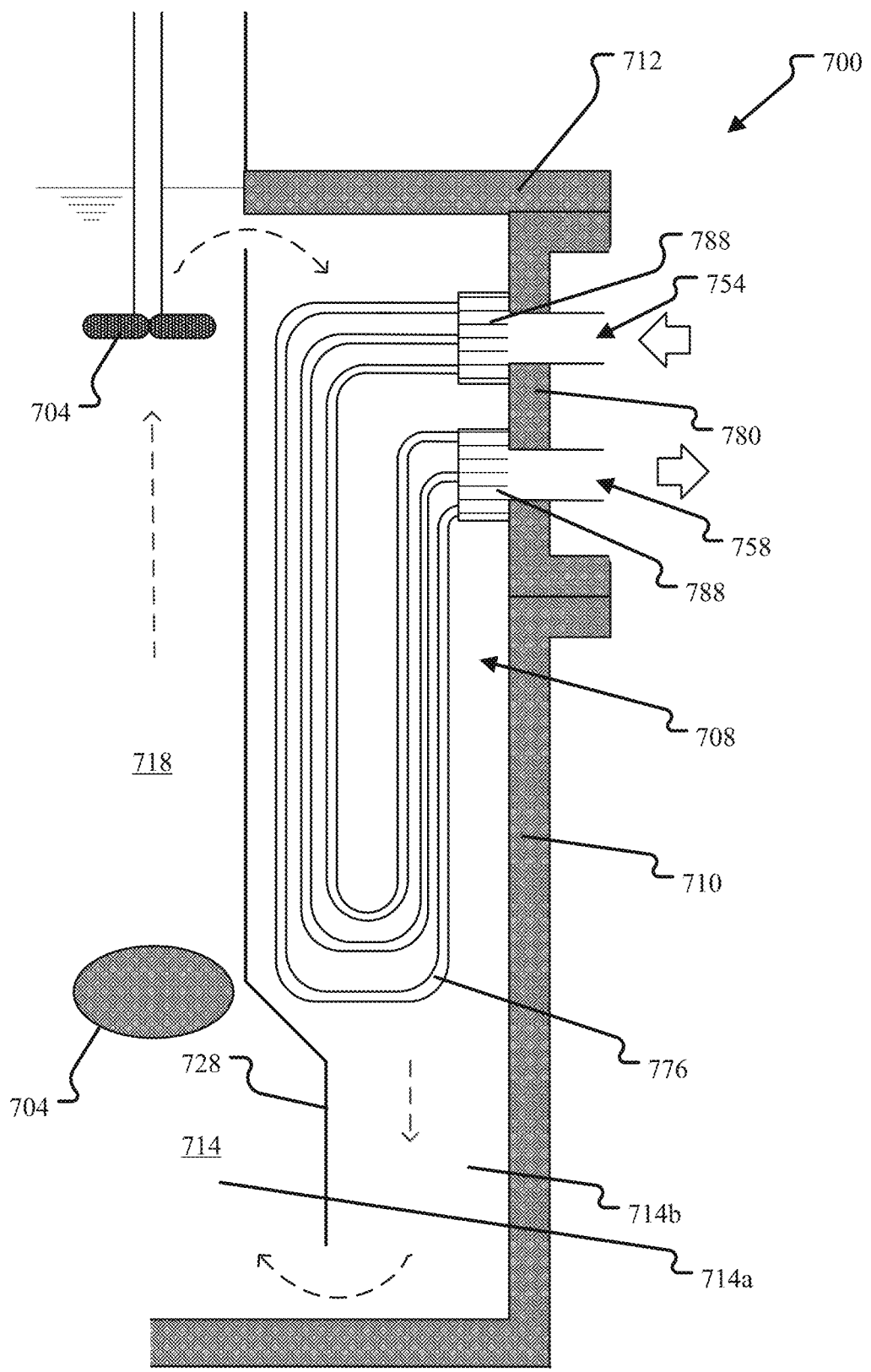
FIG. 7 illustrates a cross-section view of a portion of a test reactor showing yet another embodiment of a heat exchanger design suitable for use in a test reactor.

FIG. 7 illustrates a cross-section view of a portion of a test reactor showing yet another embodiment of a heat exchanger design suitable for use in a test reactor. In the embodiment shown, the reactor 700 has a vessel that is again divided into three sections: a lower vessel 710 having no penetrations; a heat exchanger vessel section 780, and a vessel head 712. Direction of fuel salt flow is illustrated by the dashed lines. In the embodiment shown, a draft tube 728 separates downwardly flowing fuel salt in the downcomer duct 714*b* from the central reactor core 714*a* so that, in this embodiment, the downwardly flowing fuel salt does provide neutrons to the central reactor core 714*a*, so that the active core 714 includes both the downcomer duct 714*b* and central region 714*a*. The fuel salt flows upwardly out of the central reactor core 714*a*, around a reflector plug 730, into the upcomer duct 718 to the impeller 704 that drives the flow then outward to the top of the heat exchanger 708. In this embodiment, the reflector plug 730 is illustrated as a spheroid to illustrate that the plug 730 can be any shape. As described above, the plug 730 may be moveable in order to control reactivity of the reactor 700.

In the heat exchanger embodiment shown, the tubes are in a pendant configuration. FIG. 7 shows three tubes 776 positioned in the downwardly flowing fuel salt. The primary coolant flows into a coolant inlet 754, through a diffuser 788 that distributes the coolant flow between the tubes 776. The coolant flows through the tubes and then exits through another diffuser 788 that collects the coolant flow and discharges it via a coolant outlet 758. The pendant shape of the tubes 776 is roughly a vertical U-shape with additional horizontal tube sections that connect the tops of each leg of the U to the diffusers 788 at the side of the heat exchanger vessel section 780.

FIG. 7 does not illustrate any reflectors. External reflectors could be provided laterally and below the bottom of the reactor vessel 710. Alternatively, internal reflectors such as those shown in the reactor 100 in FIGS. 1A-1F could be provided to consume some of the internal volume of the reactor vessel 710. Likewise, internal lateral reflectors could provided between the wall of the heat exchanger vessel section 780 and fuel salt flow region in which the tubes 776 reside. In yet another embodiment, some or all of the draft tube 728 could be a reflector to protect the tubes from neutrons generated in the reactor core 714 or the upcomer 718 such as described above.

Notwithstanding the appended claims, the disclosure is also defined by the embodiments described by following clauses:

1. A molten fuel salt nuclear reactor comprising:
   a vessel defining a reactor volume, the vessel being open-topped and otherwise having no penetrations;
   a neutron reflector within the vessel and displacing at least some of the reactor volume, the neutron reflector defining a reactor core volume;
   a plurality of heat exchangers within the vessel above the neutron reflector;
   a flow guide assembly within the neutron reflector, the flow guide assembly including a draft tube and at least one external surface defining a portion of a plurality outlet ducts, each outlet duct associated with a different one of the plurality of heat exchangers, the draft tube separating a central region of the reactor core volume from an annular downcomer duct hydraulically connected to each outlet duct;
   an upper displacement component displacing at least some of the reactor volume and defining a plurality of heat exchanger volumes, each heat exchanger volume associated with a different one of the plurality of heat exchangers;
   a vessel head; and
   a pump assembly.

2. The molten fuel salt nuclear reactor of clause 1, wherein the draft tube extends into the reactor volume to leave an annular opening at the bottom of the reactor core volume allowing fluid to flow from the downcomer duct into the central region of the reactor core volume.

3. The molten fuel salt nuclear reactor of clause 1, wherein the draft tube is perforated.

4. The molten fuel salt nuclear reactor of clause 1, wherein the vessel head is provided with a plurality of penetrations including a penetration associated with a different one of the plurality of heat exchangers and a penetration for receiving the pump assembly.

5. The molten fuel salt nuclear reactor of clause 1, wherein each heat exchanger is a shell-and-tube heat exchanger having a shell defining an interior shell volume, U-tubes within the shell volume hydraulically connected to a coolant system, and the interior shell volume hydraulically connected to the reactor core volume via its associated outlet duct and the downcomer duct.

6. The molten fuel salt nuclear reactor of clause 5 further comprising:
   an upcomer duct hydraulically connecting the top of the central region of the reactor core volume to the interior shell volume of each one of the heat exchangers, the upcomer duct defined laterally by the upper displacement component.

7. The molten fuel salt nuclear reactor of clause 1, wherein each of the outlet ducts is defined by at least one surface of the flow guide assembly and at least one surface of the neutron reflector.

8. The molten fuel salt nuclear reactor of clause 1 further comprising:
an expansion volume above and hydraulically connected to the upcomer duct.

9. The molten fuel salt nuclear reactor of clause 8, wherein the vessel head is adapted to seal the top of the vessel and includes a hollow expansion column that defines the expansion volume for receiving overflow fuel salt from the upcomer duct.

10. The molten fuel salt nuclear reactor of clause 1, wherein the neutron reflector is a two-part assembly of a lower axial reflector and a radial reflector adapted to be inserted into the vessel.

11. The molten fuel salt nuclear reactor of clause 1, wherein the pump assembly includes an impeller that draws fuel salt upward into the impeller and drives it laterally outward towards each of the heat exchangers.

12. The molten fuel salt nuclear reactor of clause 1 further comprising: a reflector plug between the upcomer duct and the central region of the reactor core volume.

13. The molten fuel salt nuclear reactor of clause 12, wherein the reflector plug is vertically moveable between an upper position within the flow guide assembly to a lower position within the flow guide assembly.

14. The molten fuel salt nuclear reactor of clause 12, wherein the reflector plug has a neutron reflecting side facing the central region of the reactor core volume.

15. The molten fuel salt nuclear reactor of claim 12, wherein the reflector plug has a neutron absorbing side facing the upcomer duct.

16. The molten fuel salt nuclear reactor of clause 12, wherein the reflector plug has a neutron reflecting side facing the central region of the reactor core volume and a neutron absorbing side facing the upcomer duct.

17. The molten fuel salt nuclear reactor of clause 14 or 16, wherein the reflector plug having a neutron reflecting side facing the central region of the reactor core volume comprises:
an external structure; and
neutron reflecting material contained within the external structure, the neutron absorbing material adjacent to the central region of the reactor core volume.

18. The molten fuel salt nuclear reactor of clause 15 or 16, wherein the reflector plug having a neutron absorbing side facing the upcomer duct comprises:
an external structure; and
neutron absorbing material contained within the external structure, the neutron absorbing material adjacent to the upcomer duct.

19. The molten fuel salt nuclear reactor of clause 17, wherein the neutron reflecting material is selected from Pb, Pb—Bi alloy, iron and alloys thereof, steel, graphite, SiC, BeO, MgO, $ZrSiO_4$, PbO, $Zr_3Si_2$, $Al_2O_3$, and any combination thereof.

20. The molten fuel salt nuclear reactor of clause 18, wherein the neutron absorbing material is selected from $B_4C$, $Mo_2B_5$, hafnium diboride, titanium diboride, dysprosium titanate, gadolinium titanate, cadmium and alloys thereof, hafnium and alloys thereof, gadolinium and alloys thereof, cobalt and alloys thereof, samarium and alloys thereof, titanium and alloys thereof, dysprosium and alloys thereof, erbium and alloys thereof, europium and alloys thereof, molybdenum and alloys thereof, ytterbium and alloys thereof, and any combination thereof.

21. The molten fuel salt nuclear reactor of clauses 17 or 18, wherein the external structure is made of a material selected from 316 stainless, HT-9, a molybdenum alloy, a zirconium alloy (e.g., ZIRCALOY™), SiC, graphite, a niobium alloy, nickel or alloy thereof (e.g., HASTELLOY™ N), high temperature ferritic, martensitic, or stainless steel, and any combination thereof.

22. The molten fuel salt nuclear reactor of clauses 1-21, wherein the draft tube is made of material selected from SiC, graphite, SiC composites, ceramic fiber composites, ceramic matrix composites, and any combination thereof.

23. The molten fuel salt nuclear reactor of clauses 1-21, wherein the heat exchanger volumes are symmetrically distributed laterally around the upcomer duct.

24. The molten fuel salt nuclear reactor of clauses 1-21 having four heat exchangers.

25. The molten fuel salt nuclear reactor of clauses 1-21 having six heat exchangers.

26. The molten fuel salt nuclear reactor of clauses 1-25 wherein each heat exchanger and the pump assembly may be removed by lifting from the vessel head without the need to remove the vessel head.

27. A molten salt nuclear reactor comprising:
a lower vessel defining a reactor volume, the lower vessel being open-topped and otherwise having no penetrations;
a vessel head defining a head volume; and
a heat exchanger section between the vessel head and the lower vessel, the heat exchanger section having an upper tubesheet and a lower tubesheet separated by lateral side wall, the upper tubesheet and the lower tubesheet penetrated by tubes that hydraulically connect the reactor volume to the head volume such that the upper tubesheet, the lower tubesheet and the lateral side wall define a shell volume of a shell-and-tube heat exchanger.

28. The molten fuel salt nuclear reactor of clause 27, wherein a first set of tubes hydraulically connects the head volume to a downcomer duct in the lower vessel and second set of one or more tubes that hydraulically connects the head volume to a reactor volume in the lower vessel.

29. The molten fuel salt nuclear reactor of clause 28, wherein the downcomer duct is separated from the reactor volume by a reflector adapted to reflect neutrons into the reactor volume.

30. The molten fuel salt nuclear reactor of clauses 27-29, wherein the lateral side wall includes at least one coolant inlet adapted to deliver coolant into the shell volume and at least one coolant outlet adapted to remove coolant to the shell volume.

31. The molten fuel salt nuclear reactor of clauses 27-30, wherein the vessel head includes an impeller in a pump plenum, the impeller adapted to flow fuel salt upwardly from the reactor volume into the head volume.

32. The molten fuel salt nuclear reactor of clauses 27-31, wherein the second set of one or more tubes is a single tube in a center of the heat exchanger section.

33. The molten fuel salt nuclear reactor of clauses 27-31, wherein the second set of one or more tubes is a plurality of tubes in the center of the heat exchanger section.

34. A molten salt nuclear reactor comprising: a lower vessel defining a reactor volume, the lower vessel being open-topped and otherwise having no penetrations;
a vessel head defining a head volume; and
a heat exchanger section between the vessel head and the lower vessel, the heat exchanger section having lateral side wall having a coolant inlet, a coolant outlet, and a plurality of tubes that extend from the coolant inlet through the reactor volume to the coolant outlet.

35. The molten fuel salt nuclear reactor of clause 34, further comprising a neutron reflector within the lower vessel and displacing at least some of the reactor volume, the neutron reflector including a draft tube defining a central region of the reactor volume and a downcomer duct; and wherein the plurality of tubes extend through the downcomer duct.

36. The molten fuel salt nuclear reactor of clause 34, wherein the neutron reflector extends into the reactor volume to leave an annular opening at the bottom of the reactor volume allowing fluid to flow from the downcomer duct into the central region of the reactor volume.

37. The molten fuel salt nuclear reactor of clause 34 further comprising:

a pump assembly including an impeller adapted to circulate molten fuel salt between the reactor volume and the downcomer duct; and wherein the vessel head is provided with a penetration for receiving the pump assembly.

38. The molten fuel salt nuclear reactor of clauses 34-37 further comprising:

an upcomer duct hydraulically connecting the top of the reactor volume to the downcomer duct.

39. The molten fuel salt nuclear reactor of clause 38 further comprising:

an expansion volume above and hydraulically connected to the upcomer duct.

40. The molten fuel salt nuclear reactor of clause 39, wherein the vessel head is adapted to seal the top of the vessel and includes a hollow expansion column that defines the expansion volume for receiving overflow fuel salt from the upcomer duct.

41. The molten fuel salt nuclear reactor of clauses 34-40, wherein the neutron reflector is a two-part assembly of a lower axial reflector and a radial reflector adapted to be inserted into the vessel.

42. The molten fuel salt nuclear reactor of clauses 34-41 further comprising:

a reflector plug between the upcomer duct and the reactor volume.

43. The molten fuel salt nuclear reactor of clause 42, wherein the reflector plug is vertically moveable between a upper position within the reactor volume to a lower position within the reactor volume.

44. The molten fuel salt nuclear reactor of clause 42, wherein the reflector plug has a neutron reflecting side facing the reactor volume.

45. The molten fuel salt nuclear reactor of claim 42, wherein the reflector plug has a neutron absorbing side facing the upcomer duct.

46. The molten fuel salt nuclear reactor of clause 42, wherein the reflector plug has a neutron reflecting side facing the reactor volume and a neutron absorbing side facing the upcomer duct.

47. The molten fuel salt nuclear reactor of clause 44 or 46, wherein the reflector plug having a neutron reflecting side facing the reactor volume comprises:

an external structure; and neutron reflecting material contained within the external structure, the neutron absorbing material adjacent to the central region of the reactor volume.

48. The molten fuel salt nuclear reactor of clause 45 or 46, wherein the reflector plug having a neutron absorbing side facing the upcomer duct comprises:

an external structure; and neutron absorbing material contained within the external structure, the neutron absorbing material adjacent to the upcomer duct.

49. The molten fuel salt nuclear reactor of clause 47, wherein the neutron reflecting material is selected from Pb, Pb—Bi alloy, iron and alloys thereof, steel, graphite, SiC, BeO, MgO, $ZrSiO_4$, PbO, $Zr_3Si_2$, $Al_2O_3$, and any combination thereof.

50. The molten fuel salt nuclear reactor of clause 48, wherein the neutron absorbing material is selected from $B_4C$, $Mo_2B_5$, hafnium diboride, titanium diboride, dysprosium titanate, gadolinium titanate, cadmium and alloys thereof, hafnium and alloys thereof, gadolinium and alloys thereof, cobalt and alloys thereof, samarium and alloys thereof, titanium and alloys thereof, dysprosium and alloys thereof, erbium and alloys thereof, europium and alloys thereof, molybdenum and alloys thereof, ytterbium and alloys thereof, and any combination thereof.

51. The molten fuel salt nuclear reactor of clauses 47 or 48, wherein the external structure is made of a material selected from 316 stainless, HT-9, a molybdenum alloy, a zirconium alloy (e.g., ZIRCALOY™), SiC, graphite, a niobium alloy, nickel or alloy thereof (e.g., HASTELLOY™ N), high temperature ferritic, martensitic, or stainless steel, and any combination thereof.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A molten fuel salt nuclear reactor comprising:
a vessel defining a reactor volume, the vessel being open-topped and otherwise having no penetrations;
a neutron reflector within the vessel and displacing at least some of the reactor volume, the neutron reflector defining a reactor core volume;

a plurality of heat exchangers within the vessel above the neutron reflector;

a flow guide assembly within the neutron reflector, the flow guide assembly including a draft tube and at least one external surface defining a portion of a plurality of outlet ducts, each outlet duct associated with a different one of the plurality of heat exchangers, the draft tube separating a central region of the reactor core volume from an annular downcomer duct hydraulically connected to each outlet duct;

an upper displacement component displacing at least some of the reactor volume and defining a plurality of heat exchanger volumes, each heat exchanger volume associated with a different one of the plurality of heat exchangers;

a vessel head; and a pump assembly.

2. The molten fuel salt nuclear reactor of claim 1, wherein the draft tube extends into the reactor volume to leave an annular opening at the bottom of the reactor core volume allowing fluid to flow from the downcomer duct into the central region of the reactor core volume.

3. The molten fuel salt nuclear reactor of claim 1, wherein the draft tube is perforated.

4. The molten fuel salt nuclear reactor of claim 1, wherein the vessel head is provided with a plurality of penetrations including a penetration associated with a different one of the plurality of heat exchangers and a penetration for receiving the pump assembly.

5. The molten fuel salt nuclear reactor of claim 1, wherein each heat exchanger is a shell-and-tube heat exchanger having a shell defining an interior shell volume, U-tubes within the shell volume hydraulically connected to a coolant system, and the interior shell volume hydraulically connected to the reactor core volume via its associated outlet duct and the downcomer duct.

6. The molten fuel salt nuclear reactor of claim 5 further comprising:

an upcomer duct hydraulically connecting the top of the central region of the reactor core volume to the interior shell volume of each one of the heat exchangers, the upcomer duct defined laterally by the upper displacement component.

7. The molten fuel salt nuclear reactor of claim 1, wherein each of the outlet ducts is defined by at least one surface of the flow guide assembly and at least one surface of the neutron reflector.

8. The molten fuel salt nuclear reactor of claim 6 further comprising:

an expansion volume above and hydraulically connected to the upcomer duct.

9. The molten fuel salt nuclear reactor of claim 8, wherein the vessel head is adapted to seal the top of the vessel and includes a hollow expansion column that defines the expansion volume for receiving overflow fuel salt from the upcomer duct.

10. The molten fuel salt nuclear reactor of claim 1, wherein the neutron reflector is a two-part assembly of a lower axial reflector and a radial reflector adapted to be inserted into the vessel.

11. The molten fuel salt nuclear reactor of claim 1, wherein the pump assembly includes an impeller that draws fuel salt upward into the impeller and drives it laterally outward towards each of the heat exchangers.

12. The molten fuel salt nuclear reactor of claim 6 further comprising:

a reflector plug between the upcomer duct and the central region of the reactor core volume.

13. The molten fuel salt nuclear reactor of claim 12, wherein the reflector plug is vertically moveable between a upper position within the flow guide assembly to a lower position within the flow guide assembly.

14. The molten fuel salt nuclear reactor of claim 12, wherein the reflector plug has a neutron reflecting side facing the central region of the reactor core volume.

15. The molten fuel salt nuclear reactor of claim 12, wherein the reflector plug has a neutron absorbing side facing the upcomer duct.

16. The molten fuel salt nuclear reactor of claim 12, wherein the reflector plug has a neutron reflecting side facing the central region of the reactor core volume and a neutron absorbing side facing the upcomer duct.

17. The molten fuel salt nuclear reactor of claim 14, wherein the reflector plug having a neutron reflecting side facing the central region of the reactor core volume comprises:

an external structure; and neutron reflecting material contained within the external structure, the neutron absorbing material adjacent to the central region of the reactor core volume.

18. The molten fuel salt nuclear reactor of claim 15, wherein the reflector plug having a neutron absorbing side facing the upcomer duct comprises:

an external structure; and neutron absorbing material contained within the external structure, the neutron absorbing material adjacent to the upcomer duct.

19. The molten fuel salt nuclear reactor of claim 1, wherein the draft tube is disposed along a central longitudinal axis of the vessel.

* * * * *